US009809328B2

(12) United States Patent
Nguyen et al.

(10) Patent No.: US 9,809,328 B2
(45) Date of Patent: Nov. 7, 2017

(54) ATTITUDE DETERMINATION USING INFRARED EARTH HORIZON SENSORS

(71) Applicant: Massachusetts Institute of Technology, Cambridge, MA (US)

(72) Inventors: Tam Nguyen Thuc Nguyen, Cambridge, MA (US); Kerri L. Cahoy, Lexington, MA (US); Meghan K. Quadrino, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 83 days.

(21) Appl. No.: 14/644,425

(22) Filed: Mar. 11, 2015

(65) Prior Publication Data
US 2015/0298827 A1    Oct. 22, 2015

Related U.S. Application Data

(60) Provisional application No. 61/982,414, filed on Apr. 22, 2014.

(51) Int. Cl.
*B64G 1/36* (2006.01)
*B64G 1/24* (2006.01)
(Continued)

(52) U.S. Cl.
CPC ............ *B64G 1/365* (2013.01); *B64G 1/26* (2013.01); *B64G 1/281* (2013.01); *B64G 1/283* (2013.01);
(Continued)

(58) Field of Classification Search
CPC .......... B64G 1/363; B64G 1/365; B64G 1/36; G01S 5/163; G01C 21/025
See application file for complete search history.

(56) References Cited

U.S. PATENT DOCUMENTS

| 5,367,371 | A |   | 11/1994 | Krawczyk |
| 5,508,932 | A | * | 4/1996  | Achkar ............... B64G 1/24 244/164 |

(Continued)

FOREIGN PATENT DOCUMENTS

EP    2 073 404 A1    6/2009

OTHER PUBLICATIONS

PCT International Search Report and Written Opinion dated Jun. 29, 2015 corresponding to International Application No. PCT/US2015/019890; 14 Pages.

(Continued)

*Primary Examiner* — Adam Tissot
*Assistant Examiner* — Aaron Smith
(74) *Attorney, Agent, or Firm* — Daly, Crowley, Mofford & Durkee, LLP

(57) ABSTRACT

Described herein are systems and methods for attitude determination using infrared Earth horizon sensors (EHSs) with Gaussian response characteristics. Attitude information is acquired by detecting Earth's infrared electromagnetic radiation and, subsequently, determining the region obscured by Earth in the sensors' fields of view to compute a nadir vector estimation in the spacecraft's body frame. The method can be applied when two sensors, each with known and distinct pointing directions, detect the horizon, which is defined as having their fields of view partially obscured by Earth. The method can be implemented compactly to provide high-accuracy attitude within small spacecraft, such as CubeSat-based satellites.

19 Claims, 9 Drawing Sheets

(51) Int. Cl.
 B64G 1/26 (2006.01)
 B64G 1/28 (2006.01)
 B64G 1/32 (2006.01)
 B64G 1/34 (2006.01)
 B64G 1/40 (2006.01)

(52) U.S. Cl.
 CPC ............. *B64G 1/285* (2013.01); *B64G 1/286* (2013.01); *B64G 1/288* (2013.01); *B64G 1/32* (2013.01); *B64G 1/34* (2013.01); *B64G 1/36* (2013.01); *B64G 1/363* (2013.01); *B64G 1/366* (2013.01); *B64G 1/407* (2013.01); *B64G 2001/245* (2013.01)

(56) References Cited

U.S. PATENT DOCUMENTS

| | | |
|---|---|---|
| 5,710,652 A | 1/1998 | Bloom et al. |
| 5,903,545 A | 5/1999 | Sabourin et al. |
| 6,087,646 A | 7/2000 | Didinsky |
| 6,098,929 A * | 8/2000 | Falbel .................. B64G 1/361 244/171 |
| 6,147,644 A | 11/2000 | Castles et al. |
| 6,268,944 B1 | 7/2001 | Szapiel |
| 6,297,897 B1 | 10/2001 | Czichy et al. |
| 6,411,414 B1 | 6/2002 | Abate et al. |
| 6,445,496 B1 | 9/2002 | Presby et al. |
| 6,535,734 B1 * | 3/2003 | Miller .................. H01Q 1/125 342/354 |
| 6,674,576 B1 | 1/2004 | Carollo et al. |
| 7,197,248 B1 | 3/2007 | Vorontsov et al. |
| 7,292,789 B1 | 11/2007 | Capots et al. |
| 7,343,099 B2 | 3/2008 | Wirth et al. |
| 7,379,673 B2 | 5/2008 | Krill et al. |
| 7,631,839 B1 | 12/2009 | Duncan et al. |
| 7,925,167 B1 | 4/2011 | Kozubal et al. |
| 8,526,328 B2 | 9/2013 | Hunt |
| 9,048,950 B2 | 6/2015 | Chen et al. |
| 9,304,259 B1 | 4/2016 | Yasumura |
| 2002/0121574 A1 | 9/2002 | Davis |
| 2002/0167702 A1 | 11/2002 | Badesha et al. |
| 2003/0095302 A1 | 5/2003 | Schuster et al. |
| 2003/0172208 A1 | 9/2003 | Fidler |
| 2004/0127158 A1 | 7/2004 | Dai et al. |
| 2004/0148083 A1 | 7/2004 | Arakawa et al. |
| 2004/0249964 A1 | 12/2004 | Mougel |
| 2005/0100339 A1 | 5/2005 | Tegge, Jr. |
| 2006/0030258 A1 | 2/2006 | Mocquard et al. |
| 2007/0031151 A1 | 2/2007 | Cunningham et al. |
| 2008/0123738 A1 | 5/2008 | Katsavounidis et al. |
| 2010/0021166 A1 | 1/2010 | Way |
| 2010/0090866 A1 | 4/2010 | Chen et al. |
| 2010/0201566 A1 | 8/2010 | Wyler |
| 2010/0226495 A1 | 9/2010 | Kelly et al. |
| 2011/0004405 A1 * | 1/2011 | Hutchin ............... G01C 21/025 701/513 |
| 2011/0239421 A1 | 10/2011 | Tertitski et al. |
| 2011/0274429 A1 | 11/2011 | Caplan et al. |
| 2012/0008961 A1 | 1/2012 | Chen et al. |
| 2012/0109425 A1 | 5/2012 | Janson et al. |
| 2012/0199697 A1 | 8/2012 | Nagabhushan et al. |
| 2012/0276898 A1 | 11/2012 | Korb et al. |
| 2013/0156439 A1 | 6/2013 | Arnold et al. |
| 2013/0182620 A1 | 7/2013 | Chaffee et al. |
| 2013/0193303 A1 | 8/2013 | Smith et al. |
| 2013/0208082 A1 | 8/2013 | Williams et al. |
| 2013/0293414 A1 | 11/2013 | Robinson et al. |
| 2014/0016932 A1 | 1/2014 | Coleman et al. |
| 2014/0016941 A1 | 1/2014 | Coleman et al. |
| 2014/0222472 A1 | 8/2014 | Platzer |
| 2014/0266420 A1 | 9/2014 | Brown et al. |
| 2014/0270749 A1 | 9/2014 | Miniscalco et al. |
| 2014/0294399 A1 | 10/2014 | Makowski et al. |
| 2014/0341586 A1 | 11/2014 | Wyler |
| 2014/0354477 A1 | 12/2014 | Robinson |
| 2014/0354996 A1 | 12/2014 | Fontecchio et al. |
| 2014/0362875 A1 | 12/2014 | Le Kernec et al. |
| 2014/0376001 A1 | 12/2014 | Swanson |
| 2015/0110491 A1 | 4/2015 | Gayrard et al. |
| 2015/0125157 A1 | 5/2015 | Chao et al. |
| 2015/0207562 A1 | 7/2015 | Brumley, II et al. |
| 2016/0043800 A1 | 2/2016 | Kingsbury et al. |

OTHER PUBLICATIONS

Aherne et al., "Aeneas—Colony I Meets Three-Axis Pointing;" Proceedings of the 25th Annual AIAA/USU Conference on Small Satellites; 2011; 11 Pages.

Biswas et al., "The Atmospheric Channel;" Chapter 3 of Deep Space Optical Communications; 2006; 93 Pages.

Coffee et al., "Propagation of CubeSats in LEO Using NORAD Two Line Element Sets: Accuracy and Update Frequency;" Proceedings of the AIAA Guidance, Navigation, and Control Conference; Aug. 19-22, 2013; 15 Pages.

Kneller et al., "Cadet: A High Data Rate Software Defined Radio for SmallSat Applications;" Proceedings of the 26th Annual AIAA/USU Conference on Small Satellites; 2012; 10 Pages.

Carl Christian Liebe, "Accuracy Performance of Star Trackers—A Tutorial;" Proceedings of the IEEE Transactions on Aerospace and Electronic Systems, vol. 28, No. 2; Apr. 2002; 13 Pages.

Oaida et al., "OPALS: An Optical Communications Technology Demonstration from the International Space Station;" Proceedings of the IEEE Aerospace Conference; Jun. 2013; 20 Pages.

Pong et al., "High-Precision Pointing and Attitude Determination and Control on ExoplanetSat;" Proceedings of the AIAA Guidance, Navigation, and Control Conference; Aug. 13-16, 2012; 24 Pages.

Robinson et al., "The Lunar Laser Communications Demonstration;" Proceedings of the 2011 IEEE International Conference on Space Optical Systems and Applications (ICSOS); 2011; 4 Pages.

Sarda et al., "Canadian Advanced Nanospace Experiment 2 Orbit Operations: Two Years of Pushing the Nanosatellite Performance Envelope;" Proceedings of the ESA Small Satellites, Services and Systems Symposium; 2010; 20 Pages.

Kingsbury et al., "Design of a Free-Space Optical Communication Module for Small Satellites;" Proceedings of the 28th Annual AIAA/USU Small Satellite Conference; 2014; 10 Pages.

Nguyen et al., "Development of a Pointing, Acquisition, and Tracking System for a CubeSat Optical Communication Module;" Proceedings of the SPIE, vol. 9354; 2015; 9 Pages.

Caplan et al., "Demonstration of 2.5-Gslot/s Optically-Preamplified M-PPM with 4 Photons/Bit Receiver Sensitivity;" Proceedings of the Optical Fiber Conference (OFC), Paper PDP23; 2005; 3 Pages.

D.O. Caplan, "Laser Communication Transmitter and Receiver Design;" Journal of Optical and Fiber Communications Reports, vol. 4; 2007; 138 Pages.

Shirasaki et al., "Fibre Transmission Properties of Optical Pulses Produced Through Direct Phase Modulation of DFB Laser Diode;" Electronics Letters, vol. 24 No. 8; Apr. 1988; 3 Pages.

Vodhanel et al., "Ten-to-Twenty Gigabit-per-Second Modulation Performance of 1.5-mm Distributed Feedback Lasers for Frequency-Shift Keying Systems;" Journal of Lightwave Technology, vol. 7, No. 10; Oct. 1989; 7 Pages.

Vodhanel et al., "Performance of Directly Modulation DFB Lasers in 10-Gb/s ASK, FSK, and DPSK Lightwave Systems;" Journal of Lightwave Technology, vol. 8, No. 9; Sep. 1990; 8 Pages.

Mahgerefteh et al., "Penalty-Free Propagation Over 600 km of Nondispersion Shifted Fiber at 2.5 Gb/s Using a Directly Laser Modulated Transmitter;" Proceedings of the Conference on Lasers and Electro-Optics, CLEO; 1999; 1 Page.

Chandrasekhar et al., "Chirp-Managed Laser and MLSE-RX Enables Transmission Over 1200 km at 1550 nm in a DWDM Environment in NZDSF at 10 Gb/s Without Any Optical Dispersion Compensation;" Proceedings of the IEEE Photonics Technology Letters, vol. 18, No. 14; Jul. 15, 2006; 3 Pages.

Caplan et al., Power-efficient Noise-insensitive Optical Modulation for High-sensitivity Laser Communications; Proceedings of the Conference on Lasers and Electro-Optics (CLEO); 2014; 2 Pages.

Bingham et al., "The Road to a Three-Axis-Stabilized CubeSat;"

(56) References Cited

OTHER PUBLICATIONS

Proceedings of the 32$^{nd}$ Annual AAS Rocky Mountain Guidance and Control Conference; Jan. 30-Feb. 4, 2009; 9 Pages.

Lee et al., "Transmission of Directly Modulated 2.5-gb/s Signals over 250-km of Nondispersion-shifted Fiber by Using a Spectral Filtering Method;" Proceedings of the IEEE Photonics Technology Letters, vol. 8, No. 12; Dec. 1996; 3 Pages.

Caplan et al., "Parallel Direct Modulation Laser Transmitters for High-Speed High-Sensitivity Laser Communications;" Proceedings of the Conference on Lasers and Electro-Optics (CLEO); Optical Society of America; 2011; 2 Pages.

D.O. Caplan, "A Technique for Measuring and Optimizing Modulator Extinction Ration;" Proceedings of the IEEE Conference on Lasers and Electro-Optics (CLEO); 2000; 2 Pages.

Michael Swartwout, "The First One Hundred CubeSats: A Statistical Look;" Journal of Small Satellites, vol. 2, No. 2; 2013; 21 Pages.

California Polytechnic State University, "CubeSat Design Specification;" PowerPoint Presentation by The CubeSat Program, Cal Poly SLO; Revision 13; 2014; 42 Pages.

Schwarzenberg-Czerny et al., "The BRITE Nano-Satellite Constellation Mission;" Proceedings of the 38$^{th}$ COSPAR Scientific Assembly; 2010; 17 Pages.

Hanson et al., "The EDSN Intersatellite Communications Architecture;" Proceedings of the 28$^{th}$ AIAA/USU Conference on Small Satellites; 2014; 11 Pages.

Klofas et al., "A Survey of CubeSat Communications Systems: 2009-2012;" Proceedings of CalPoly CubeSat Developers Workshop; 2013; 41 Pages.

Gangestad et al., "Operations, Orbit Determination, and Formation Control of the Aerocube-4 CubeSats;" Proceedings of the 27$^{th}$ AIAA/USU Conference on Small Satellites; 2013; 8 Pages.

Kingsbury et al., "Fast-Steering Solutions for CubeSat-Scale Optical Communications;" Proceedings of the International Conference on Space Optics (ICSO); Oct. 7-10, 2014; 6 Pages.

Lambert et al., "Laser Communications in Space;" Artech House Publishers, Boston, MA; 1995; 3 Pages.

Wise et al., "A Dual-Spinning, Three-Axis-Stabilized CubeSat for Earth Observation;" Proceedings of the AIAA Guidance, Navigation, and Control Conference; Aug. 19-22, 2013; 24 Pages.

Christopher Masaru Pong, "High-Precision Pointing and Attitude Estimation and Control Algorithms for Hardware-Constrained Spacecraft;" PhD Thesis, Massachusetts Institute of Technology; Jun. 2014; 254 Pages.

Buchen et al., "2014 Nano / Microsatellite Market Assessment;" PowerPoint Presentation by Spaceworks Enterprises, Inc. (SEI); 2014; 18 Pages.

Andrews et al., "Laser Beam Propagation Through Random Media;" Second Edition of SPIE—The International Society for Optical Engineering; 2005; 8 Pages.

Janson et al., "The NASA Optical Communication and Sensor Demonstration Program: An Update;" Proceedings of the 28$^{th}$ Annual AIAA/USU Conference on Small Satellites; 2014; 8 Pages.

Oaida et al., "Optical Link Design and Validation Testing of the Optical Payload for Lasercomm Science (OPALS) System;" Proceedings of SPIE, vol. 8971; The Free-Space Laser Communications Technologies XXVI; 2014; 15 Pages.

Sniegowski et al., "Development, Test and Evaluation of MEMS Micro-Mirrors for Free-Space Optical Communications;" Proceedings of SPIE, vol. 5550; Free-Space Laser Communications IV; 14 Pages.

Kingsbury et al., "Two-Stage Control for CubeSat Optical Communications;" PowerPoint Presentation of CalPoly CubeSat Developers Workshop; Apr. 24, 2014; 29 Pages.

Aerospace Corporation, "Aerocube-OCSD A, B (IOCPS A, B);" Fact Sheet; Accessed at http://space.skyrocket.de/doc_sdat/aerocube-ocsd.htm on Dec. 5, 2014; 2 Pages.

Janson et al., "The NASA Optical Communication and Sensor Demonstration Program;" PowerPoint Presentation; The Aerospace Corporation; Aug. 12, 2013; 19 Pages.

NASA, "LADEE Lunar Atmosphere and Dust Environment Explorer: LADEE Status;" Accessed at http://space.skyrocket.de/doc_sdat/aerocube-ocsd.htm on Dec. 5, 2014; 2 Pages.

Seshupriya Reddy Alluru, "A System Design of an Optical Wireless Communication System for CubeSats;" A Master's Thesis Presented to the Graduate School of University of Florida; 2010; 78 Pages.

Alluru et al., "An Optical Payload for CubeSats;" Proceedings of the 24$^{th}$ Annual AIAA/USU Conference on Small Satellites; 2010; 13 Pages.

Edwards et al., "Overview of the Laser Communications Relay Demonstration Project;" Proceedings of the Space Ops Conference; 2012; 11 Pages.

NASA, "Laser Communications Relay Demonstration: The Next Step in Optical Communications;" Fact Sheet; Accessed at www.nasa.gov; 2 Pages.

Staehle et al., "Interplanetary CubeSats: Opening the Solar System to a Broad Community at Lower Cost;" Final Report on Phase I to NASA Office of the Chief Technologist; Dec. 8, 2012; 30 Pages.

H. Hemmati, "Laser-Communications with Lunar CubeSat;" PowerPoint Presentation; Jet Propulsion Laboratory at California Institute of Technology; 2013; 11 Pages.

Sebacher et al., "Laser Crosslink Configurations for RF Satellite Communication Systems;" Proceedings of the IEEE Military Communications Conference, vol. 1; MILCOM; 1985; 6 Pages.

Vaibhav Vasant Unhelkar et al., "Spacecraft Attitude Determination with Sun Sensors, Horizon Sensors and Gyros: Comparison of Steady-State Kalman Filter and Extended Kalman Filter;" Proceedings of the Itzhack Y. Bar-Itzhack Memorial Symposium on Estimation, Navigation, and Spacecraft Control; Oct. 2012; 22 Pages.

M C Phenneger, "Infrared Horizon Modeling for Attitude Determination and Control: Analysis and Mission Experience;" NASA Technical Memorandum (vol. 86181); Mar. 1985; 239 Pages (Part 1 of 2).

M C Phenneger, "Infrared Horizon Modeling for Attitude Determination and Control: Analysis and Mission Experience;" NASA Technical Memorandum (vol. 86181); Mar. 1985; 231 Pages (Part 2 of 2).

Excelitas Technologies GmbH & Co. KG., "Thermopile Detector—TPD 1T 0214 G9 / 3850," Sensor Solutions—Product Specification; Revision Jan. 24, 2013; 4 Pages.

Contestabile et al., "40 Gb/s WDM NRZ-DPSK All-Optical Clock Recovery and Data Demodulation based on a Periodic Bragg Filter;" Proceedings of the Optical Fiber Communication/National Fiber Optic Engineers Conference (OFC/NFOEC); Feb. 24,28, 2008; 3 Pages.

Darrell, "The Internet—Brought to You by Drones and Ballons;" Retrieved from <http://www.bidnessetc.com/business/the-internet-brought-to-you-by-drones-and-balloons/>; Dated Jun. 27, 2014; 2 Pages.

Das et al., "Requirements and Challenges for Tactical Free-Space Lasercomm;" Proceedings of the Military Communications Conference (IEEE MILCOM); Nov. 16-19, 2008; 10 Pages.

Dillow, "Record-Breaking New Fiber Optic Cables Transmit 100 Terabits Per Second;" Article from Popular Science dated Apr. 29, 2011; 2 Pages.

Epple et al., "Discussion on Design Aspects for Free-Space Optical Communication Terminals;" IEEE Communications Magazine, vol. 45, Issue 10, pp. 62-69; Oct. 2007; 8 Pages.

Fields et al., "5.625 Gbps Bidirectional Laser Communications Measurements Between the NFIRE Satellite and an Optical Ground Station;" Proceedings of the International Conference on Space Optical Systems and Applications; May 11-13, 2011; pp. 44-53; 10 Pages.

Hemmati, *Near-Earth Laser Communications*; Book, Print ISBN: 978-0-8247-5381-8, CRC Press; Mar. 3, 2009; 406 Pages.

Henniger et al., "An Introduction to Free-space Optical Communications;" Radioengineering Journal, vol. 19, Issue 2; Jun. 2010; pp. 203-212; 10 Pages.

Henniger et al., "Free-space Optical Transmission Improves Landmobile Communications;" SPIE Newsroom; Jan. 9, 2007; 3 Pages.

Horwath et al., "Broadband Backhaul Communication for Stratospheric Platforms: The Stratospheric Optical Payload Experiment

(56) References Cited

OTHER PUBLICATIONS (STROPEX);" Proceedings of the SPIE, vol. 6304, Free-Space Laser Communications VI; Sep. 1, 2006; 12 Pages.

Kubo-oka, et al., "Optical Communication Experiment Using Very Small Optical TrAnsponder Component on a Small Satellite RISESAT;" Proceedings of the International Conference on Space Optical Systems and Applications (ICOS); Oct. 9-12, 2012; 6 Pages.

Maryland Aerospace Inc., "MAI-400;" Reference Manual; Apr. 29, 2014; 2 Pages.

Miniscalco et al., "Optical Space-Time Division Multiple Access;" Journal of Lightwave Technology, vol. 30, No. 11; Jun. 1, 2012; pp. 1771-1785; 15 Pages.

Moores et al., "Architecture Overview and Data Summary of a 5.4 km Free-Space Laser Communications Experiment;" Proceedings of SPIE, vol. 7464, 746404, Free-Space Laser Communications IX; Aug. 2009; 9 Pages.

Perry, "Start-up Profile: Skybox Imaging;" IEEE Spectrum; Retrieved from <http://spectrum.ieee.org/at-work/innovation/startup-profile-skybox-imaging>; Posted May 1, 2013; 3 Pages.

Stotts et al., "Hybrid Optical RF Airborne Communications;" Proceedings of the IEEE, vol. 97, No. 6; Jun. 2009; pp. 1109-1127; 19 Pages.

Stotts et al., "Optical Communications in Atmospheric Turbulence;" Proceedings of SPIE, vol. 7464, 746403, Free-Space Laser Communications IX; Aug. 21, 2009; 17 Pages.

Tyler et al., "Image-position Error Associated with a Quadrant Detector;" Journal of Optical Society of America, vol. 72, No. 6; Jun. 1982; pp. 804-808; 5 Pages.

Walther et al., "Air-to-Ground Lasercom System Demonstration Design Overview and Results Summary;" Proceedings of SPIE, vol. 7814, 78140Y, Free-Space Laser Communications X; Aug. 24, 2010; 9 Pages.

DigitalGlobe; Retrieved from <https://www.digitalglobe.com> on Jan. 13, 2016; 3 Pages.

Intelsat, Satellite Related Services; Retrieved from <http://www.intelsat.com/services/satellite-related/> on Jan. 13, 2016; 1 Page.

Laser Light Communications; Retrieved from <http://www.laserlightcomms.com/> on Jan. 13, 2016; 2 Pages.

Planet Labs Inc.; Retrieved from <https://www.planet.com/> on Jan. 7, 2016; 6 Pages.

ViaSat, About ViaSat; Retrieved from <https://www.viasat.com/about> on Jan. 13, 2016; 3 Pages.

PCT International Search Report and Written Opinion dated Feb. 24, 2016 corresponding to International Application No. PCT/US2015/043638; 13 Pages.

Vaibhav Vasant Unhelkar, "Satellite Attitude Estimation using Sun Sensors, Horizon Sensors and Gyros;" A Dissertation approved for the degree of Master of Technology and Bachelors of Technology in Aerospace Engineering; Declared Jun. 25, 2012; 133 Pages.

Vaibhav Vasant Unhelkar et al., "Spacecraft Attitude Determination with Sun Sensors, Horizon Sensors and Gyros: Comparison of Steady-State Kalman Filter and Extended Kalman Filter;" Proceedings of the Itzhack Y. Bar-Itzhack Memorial Symposium on Estimation, Navigation, and Spacecraft Control; Oct. 2012; 22 Pages.

Joseph A. Hashmall et al., "An Algorithm for Converting Static Earth Sensor Measurements into Earth Observation Vectors;" NASA Technical Memorandum from the proceedings of the Flight Mechanics Symposium; Oct. 2003; 13 Pages.

M C Phenneger, "Infrared Horizon Modeling for Attitude Determination and Control: Analysis and Mission Experience;" NASA Technical Memorandum (vol. 86181); Mar. 1985; 239 Pages. (Part 1 of 2).

M C Phenneger, "Infrared Horizon Modeling for Attitude Determination and Control: Analysis and Mission Experience;" NASA Technical Memorandum (vol. 86181); Mar. 1985; 231 Pages. (Part 2 of 2).

John L. Crassidis et al., "A Survey of Nonlinear Attitude Estimation Methods;" Journal of Guidance, Control, and Dynamics (vol. 30, No. 1); Feb. 2007; 48 Pages.

Aronne Merrelli, "The Atmospheric Information Content of Earth's Far Infrared Spectrum;" A Dissertation approved for the degree of Doctor of Philosophy (Atmospheric and Oceanic Sciences); Dated Nov. 26, 2012; 135 Pages.

Excelitas Technologies GmbH & Co. KG., "Thermopile Detector—TPD 1T 0214 G9/3850," Sensor Solutions—Product Specification; Revision Jan. 24, 2013; 4 Pages.

Janson Siegfried et al., "Attitude Control on the Pico Satellite Solar Cell Testbed-2;" Presentation of Proceedings of the $26^{th}$ Annual AIAA/USU Conference on Small Satellites; Aug. 13, 2012; 18 Pages.

Junquan Li et al., "Design of Attitude Control Systems for CubeSat-Class Nanosatellite;" Research Article from Journal of Control Science and Engineering (vol. 2013); Accepted Apr. 24, 2013; 9 Pages.

U.S. Appl. No. 14/991,394, filed Jan. 8, 2016 Boroson et al.
U.S. Appl. No. 14/991,377, filed Jan. 8, 2016 Boroson et al.
U.S. Appl. No. 14/991,386, filed Jan. 8, 2016 Boroson et al.
U.S. Appl. No. 15/054,546, filed Feb. 26, 2016 Boroson et al.

PCT International Search Report and Written Opinion dated May 11, 2016 for International Application No. PCT/US16/12641; 12 Pages.

PCT International Search Report and Written Opinion dated Jul. 26, 2016 for International Application No. PCT/US16/12644; 10 Pages.

PCT International Search Report and Written Opinion dated Jul. 26, 2016 for International Application No. PCT/US16/12643; 14 Pages.

Kramer, "EDRS (European Data Relay Satellite) Constellation;" EO Sharing Earth Observation Resources—https://directory.eoportal.org/web/eoportal/satellite-missions/e/edrs; Oct. 21, 2013; 10 Pages.

PCT International Preliminary Report for Application No. PCT/US2015/019890 dated Nov. 3, 2016; 11 Pages.

U.S. Non-Final Office Action dated Feb. 8, 2017 corresponding to U.S. Appl. No. 14/991,386; 41 Pages.

U.S. Non-Final Office Action dated Feb. 22, 2017 corresponding to U.S. Appl. No. 14/991,377; 42 Pages.

U.S. Non-Final Office Action dated Apr. 7, 2017 corresponding to U.S. Appl. No. 14/991,394; 47 Pages.

U.S. Notice of Allowance dated Apr. 12, 2017 corresponding to U.S. Appl. No. 14/817,985; 12 Pages.

PCT International Search Report and Written Opinion dated Nov. 29, 2016 corresponding to International Application No. PCT/US2016/019732; 11 Pages.

* cited by examiner

ATTITUDE DETERMINATION USING INFRARED EARTH HORIZON SENSORS

CROSS REFERENCE TO RELATED APPLICATION

This application claims the benefit under 35 U.S.C. §119 (e) of U.S. Provisional Application No. 61/982,414 filed Apr. 22, 2014, which application is incorporated herein by reference in its entirety.

GOVERNMENT RIGHTS

This invention was made with Government support under Contract No. FA8721-05-C-0002 awarded by the U.S. Air Force. The Government has certain rights in the invention.

BACKGROUND

In spacecraft control systems, the ability to provide accurate and robust attitude determination and control enable spacecraft in orbit to counter disturbances in nominal operation and to achieve mission-specific requirements. The accuracy and precision requirements are particularly challenging for small satellites (and other spacecraft) where limited volume, mass, and power are available. Attitude knowledge of small spacecraft is often achieved using devices such as sun sensors and magnetometers. However, these sensors have various limitations. Sun sensors, for example, lose their functionalities in periods of eclipse in orbit. Magnetometers, as another example, cannot acquire high accuracy attitude measurements due to the constantly changing Earth magnetic field. Earth horizon sensors (EHSs) have emerged as an efficient and relatively inexpensive means for providing relatively precise attitude determination, capable of satisfying attitude knowledge requirements of small spacecraft in low-Earth orbit (LEO), especially for missions with Earth-specific science objectives.

While the Sun and stars are effectively point sources from the perspective of a spacecraft in LEO, Earth appears as a large and bright target that is easily detected. For a spacecraft in LEO, Earth subtends a solid angle significantly wider than the solid angle of the Sun and of Betelgeuse (the ninth-brightest star in the night sky). Due to the large expanse of Earth in the spacecraft-centered unit sphere, detection of the horizon is required for precise attitude knowledge. Horizon sensors provide the primary means to directly determine the spacecraft's attitude with respect to Earth.

Infrared Earth horizon sensors detect Earth's electromagnetic radiation in the infrared spectrum, caused by the Sun's radiation being absorbed and re-radiated by Earth's surface and atmosphere. In the long-wave infrared spectrum beyond 4 μm, Earth becomes a dominant infrared radiation source, exceeding the Sun irradiation level by several orders of magnitude. Infrared radiation is often referred to as thermal radiation due to the thermal energy generated by the emission of electromagnetic radiation in this spectrum. The thermal energy emitted by Earth can be measured using thermopile detectors, devices that convert thermal energy collected in the sensor's field of view (FOV) into electrical energy. Commercial thermopile sensor units generally have Gaussian sensitivity, with the half-width at half-maximum (HWHM) defined as the effective half-angle FOV.

While large spacecraft often have EHS on scanning wheels, it is more practical for small spacecraft to have fix, body-mounted EHS system due to mass, volume, and power limitations. Thermopiles can be mounted at various locations with fixed and predetermined directions, depending on the mission altitude and sensors' FOV. Arrays of thermopiles have been utilized to maintain nadir pointing by ensuring zero temperature difference between sensors in each sensor pair along the velocity vector and side directions. To fully determine the spacecraft's attitude in an inertial frame through the TRIAD method, a full expression of the nadir vector in the spacecraft's body frame is needed. The second reference vector used in the TRIAD method can be the Sun vector, acquired by sun sensors during daytime, or the magnetic field direction, which can be determined using magnetometers during periods of eclipse.

SUMMARY

Described herein is a method to estimate a nadir vector using readings from two or more Earth horizon sensors and at least one reference sensor. This estimation method is applicable when two sensors with distinct mounting boresight directions detect the horizon, corresponding to the case where the sensors' field of view (FOV) are partially obscured by Earth. Depending on the sensors' FOV, Earth horizon sensors (EHSs) can be used for fine or coarse attitude knowledge. The attitude estimation method accommodates the memory and computation limitations of relatively small spacecraft (e.g., satellites conforming to the CubeSat specification, such as 1U, 2U, 3U, 6U, or 12U CubeSats).

According to one aspect of the disclosure, a system for spacecraft attitude determination comprises a plurality of horizon sensors, each of the plurality of horizon sensors having a respective field-of-view (FOV), each of the plurality of horizon sensors having a sensitivity to the portion of the respective FOV obscured by Earth and an attitude determination module coupled to the plurality of horizon sensors. The attitude determination module can be configured to obtain horizon sensor readings from the horizon sensors, determine an Earth disk radius in a spacecraft's body frame, convert the horizon sensor readings to nadir angles, and estimate a nadir vector using the nadir angles and the Earth disk radius.

In some embodiments, the attitude determination module is further configured to receive spacecraft position information; and determine an Earth disk radius in a spacecraft's body frame based upon the spacecraft position information. In certain embodiments, each of the plurality of horizon sensors has a Gaussian sensitivity to the portion of a respective FOV obscured by Earth and the attitude determination module uses a Gaussian approximation to convert the horizon sensor readings to nadir angles.

In some embodiments, the system further comprises a reference sensor coupled to provide reference sensor readings to the attitude determination module. Here, the attitude determination module may be configured to determine a plurality of possible nadir vector solutions using the nadir angles and the Earth disk radius, obtain a reference sensor reading, and choose one of the plurality of possible nadir vector solutions based upon the reference sensor reading.

In certain embodiments, the plurality of horizon sensors comprise a first horizon sensor mounted along a first axis in a body coordinate system, a second horizon sensor mounted along a second axis in the body coordinate system. The reference sensor can be mounted along a third axis in the body coordinate system. At least one of the plurality of horizon sensors may comprise a thermopile or an infrared radiation (IR) sensor. The reference sensor may comprise a magnetometer or a Sun sensor.

In various embodiments, the system further comprises an attitude control module coupled to receive estimated nadir vector information from the attitude determination module, the attitude control module configured to adjust a spacecraft's attitude based upon received estimated nadir vector information.

According to another aspect of the disclosure, a method for spacecraft determining attitude comprises: obtaining horizon sensor readings from a plurality of horizon sensors, each of the plurality of horizon sensors having a respective field-of-view (FOV), each of the plurality of horizon sensors having a sensitivity to the portion of the respective FOV obscured by Earth; determining an Earth disk radius in a spacecraft's body frame; converting the horizon sensor readings to nadir angles; and estimating a nadir vector using the nadir angles and the Earth disk radius. In various embodiments, the method further comprises adjusting a spacecraft's attitude based upon an estimated nadir vector.

In certain embodiments, the method further comprises receiving spacecraft position information, and determining an Earth disk radius in a spacecraft's body frame comprises determining an Earth disk radius based upon the spacecraft position information. In some embodiments, each of the plurality of horizon sensors has a Gaussian sensitivity to the portion of a respective FOV obscured by Earth, and converting the horizon sensor readings to nadir angles comprises converting the horizon sensor readings to nadir angles using a Gaussian approximation.

In various embodiments, the method further comprises determining a plurality of possible nadir vector solutions using the nadir angles and the Earth disk radius, obtaining a reference sensor reading from a reference sensor, and choosing one of the plurality of possible nadir vector solutions based upon the reference sensor reading.

In some embodiments of the method, obtaining horizon sensor readings from horizon sensors comprises obtaining a first horizon sensor reading from first horizon sensor mounted along a first axis in the spacecraft's body coordinate system and obtaining a second horizon sensor reading from a second horizon sensor mounted along a second axis in the spacecraft's body coordinate system. Here, obtaining a reference sensor reading may comprise obtaining a reference sensor reading from a reference sensor mounted along a third axis in the spacecraft's body coordinate system.

In certain embodiments, obtaining horizon sensor readings from horizon sensors comprises obtaining readings from thermopiles or infrared radiation (IR) sensors. Obtaining a reference sensor reading may comprise obtaining a reading from a magnetometer or a Sun sensor.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Within the following description, a body coordinate system (sometimes referred to as a "body frame") for a spacecraft is defined as follows: the +x direction is along the spacecraft's nominal velocity vector, the +z direction nominally points toward nadir, and the +y direction points to a side of the spacecraft selected so as to complete a right-hand coordinate system. It will be understood, however, that concepts, methods, and systems described herein can be used with any body coordinate system.

Figure 1:
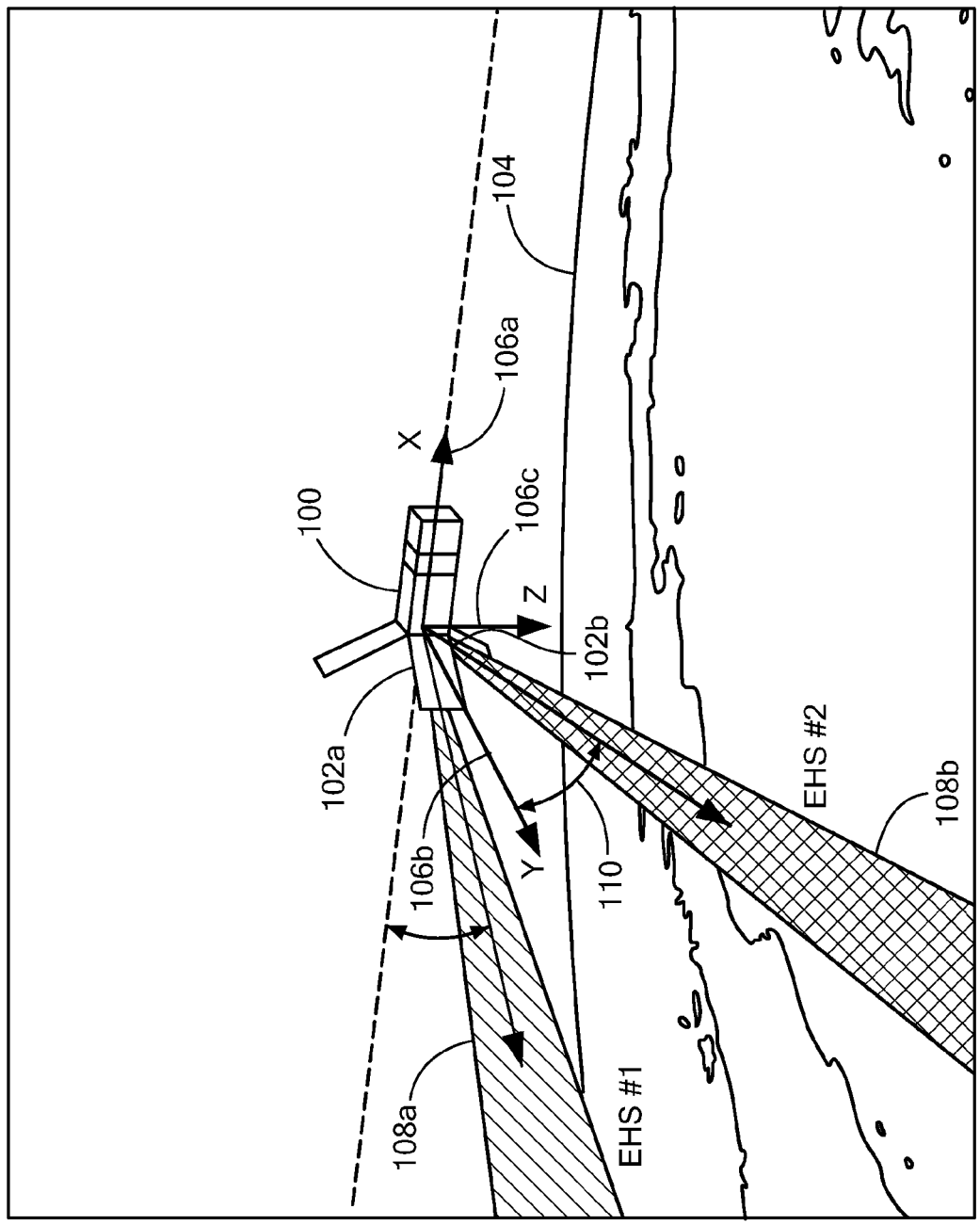
FIG. 1 is a diagram of an illustrative spacecraft orbiting Earth.

Referring to FIG. 1, an illustrative spacecraft 100 is shown orbiting Earth 104. In various embodiments, the spacecraft 100 is a satellite orbiting Earth at an altitude between 160 kilometers and 2,000 kilometers and, thus, is said to be in low-Earth orbit (LEO). The +x, +y, and +z directions of the spacecraft's body coordinate system are indicated by arrows, which are identified by respective reference numerals 106a, 106b, and 106c.

The spacecraft 100 comprises a plurality of Earth horizon sensors (EHSs or "horizon sensors") generally denoted 102 to detect infrared electromagnetic radiation from Earth 104. In the example shown, two horizon sensors 102a and 102b are mounted along the x and y axes, respectively, to provide pitch and roll knowledge of the spacecraft. The horizon sensors 102a and 102b have corresponding field of views 108a and 108b. In some embodiments, spacecraft 100 also includes a so-called "reference sensor" (not shown), the purpose of which is described below. The reference sensor may be mounted along a different axis from the horizon sensors 106 (i.e., along the z axis in the example of FIG. 1).

The horizon sensors 102 are mounted with a so-called "dip" angle 110 (denoted $\theta_z$ in equations below) in the +z direction such that Earth's horizon can be detected. In various embodiments, the dip angle $\theta_z$ between the sensors' boresights and the x-y plane is selected based upon the spacecraft's target altitude h, and the average Earth radius $R_E \approx 6,371$ kilometers (km), as shown in Equation 1.

$$\theta_Z = \cos^{-1}\left(\frac{R_E}{R_E + h}\right) \quad \text{(Equation 1)}$$

The horizon sensors 102 may comprise any suitable sensors to detect Earth's electromagnetic radiation, such as infrared radiation (i.e., thermal energy emitted by Earth). Such radiation can be measured using thermopile detectors, devices that convert thermal energy collected in the sensor's field of view (FOV) into electrical energy. In various embodiments, the horizon sensors 102 comprise commercial thermopile sensor units having Gaussian sensitivity, with the half-width at half-maximum (HWHM) defined as the effective half-angle field of view.

It should be understood that the configuration of horizon sensors 102 shown in FIG. 1 and described herein is merely illustrative. In other embodiments, a spacecraft 100 comprises three or more horizon sensors 102.

In a particular embodiment, a spacecraft 100 comprises six horizon sensors 102, with three mounted in the −x direction and three mounted in the +y direction. The horizon sensors 102 have Gaussian sensitivity with a narrow FOV (e.g., between 5° and 10°). The three sensors on each mount are reserved to be looking at deep space, Earth horizon, and Earth, and are tilted in the +z direction at angles which may be determined by the spacecraft's altitude. In one example, three horizon 102 sensors are titled in the z direction by about 10°, 20°, and 30°, respectively. Multiple sensors on a single mount can be combined to compute an effective sensor reading, mitigating the effect of varying infrared emission from Earth's surface and background disturbances.

In certain embodiments, the spacecraft 100 is a satellite conforming to the CubeSat specification. Accordingly, the spacecraft 100 may have dimensions of about 10×10×10 cm ("1U"), 20×10×10 cm ("2U"), 30×10×10 cm ("3U"), or any other multiple of 1U dimensions generally conforming to the CubeSat specification. A 1U CubeSat has mass less than or equal to 1.33 kilogram (kg).

In general operation, the spacecraft 100 acquires attitude information by detecting infrared electromagnetic radiation from Earth 104 via horizon sensors 102. Earth's surface and atmosphere absorbs and reradiates the Sun's radiation the infrared (IR) range. For spacecraft in LEO, IR radiation from the Sun and other stars is insignificant due to the small solid angle subtended by the stars in comparison to Earth. For example, at LEO, the Sun may have a solid angle of about $7 \times 10^{-5}$ steradian (sr), whereas Earth may have a solid angle of about 4 sr. Thus, using EHSs 102 angled down towards Earth's horizon, the spacecraft 100 can determine the region obscured by Earth 104 in each horizon sensor's field of view. Based upon this information, attitude estimation techniques can be deployed to estimate the nadir vector and adjust the spacecraft's attitude accordingly, as described further below in conjunction with FIGS. 3A-3F and 4.

Figure 2:
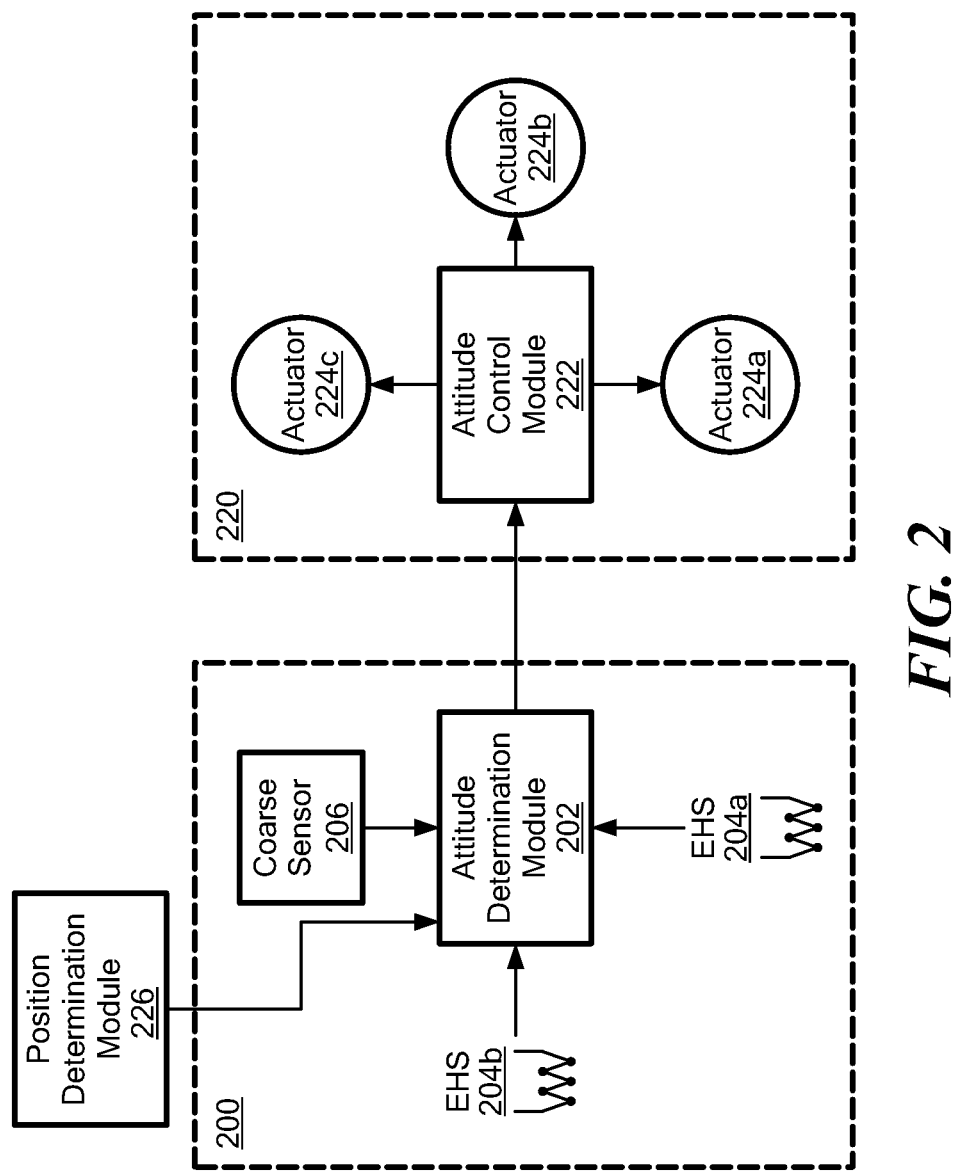
FIG. 2 is a block diagram of an illustrative attitude determination system and an illustrative attitude control system for use with the spacecraft of FIG. 1.

FIG. 2 shows an attitude determination system 200 coupled to an attitude control system 220. The attitude determination and/or control systems 200, 220 may be housed within a spacecraft (or otherwise supported by the spacecraft), such as spacecraft 100 of FIG. 1.

The attitude determination system 200 comprises an attitude determination module 202 and a plurality of horizon sensors 204 coupled thereto. In the embodiment shown, the system 200 includes two horizon sensors 204a, 204b, which could be the same as or similar to horizon sensors 102a, 102b of FIG. 1. In some embodiments, the horizon sensors 204a, 204b are positioned (or otherwise disposed or configured) so that the resulting nadir vector solutions are separated by an angle sufficiently large to unambiguously choose the correct nadir vector, as described below in conjunction with FIGS. 3B and 3D.

In some embodiments, the system 200 further comprises an additional attitude sensor 206, separate and distinct from the horizon sensors 204, which can be coupled to the attitude determination module 202. As will be discussed below, the additional sensor 206 is used to resolve ambiguity between nadir vector solutions and, therefore, is referred to herein as a "reference sensor" 206. The reference sensor 206 can be any suitable attitude sensor that is suitable to resolve ambiguity from EHS solutions according to the techniques described below in conjunction with FIGS. 3A-3F and 4. In some embodiments, the reference sensor 206 is relatively inaccurate compared the horizon sensors 204. For example, the reference sensor 206 may comprise a Sun sensor (for use during daytime) or a magnetometer (for use during daytime or eclipse in LEO). However, it should be understood that the reference sensor 206 could also be highly accurate.

In various embodiments, the reference sensor 206 may be mounted along a different axis from the horizon sensors 204a, 204b. For example, if the horizon sensors 204a and 204b are mounted along the x and y axes of the body coordinate system, respectively, the reference sensor 206 can be mounted along the z axis of the body coordinate system.

Figure 4:
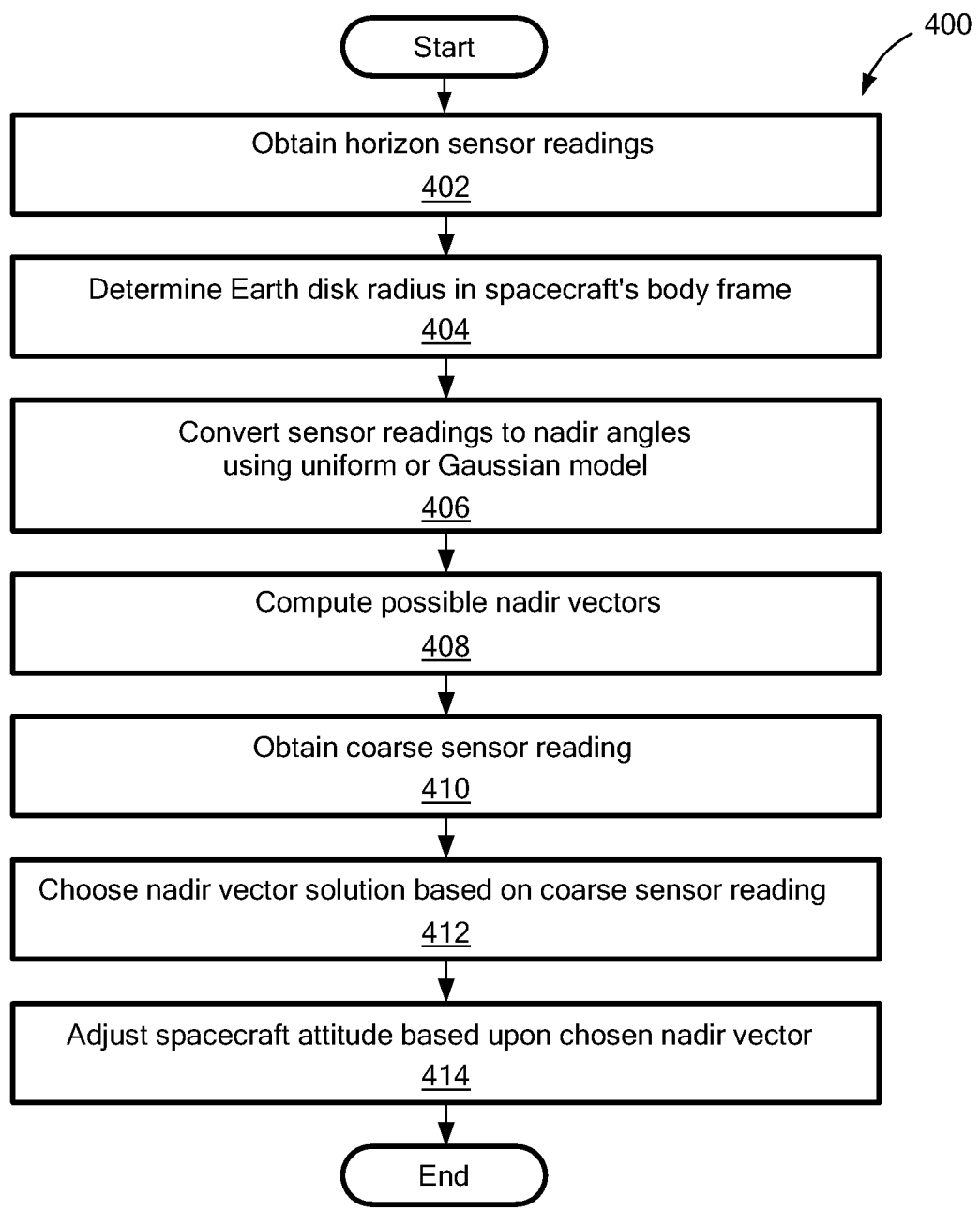
FIG. 4 is a flowchart of a method for use with the spacecraft of FIG. 1.

The attitude determination module 202 is configured to determine a spacecraft's attitude in an inertial frame based upon readings from the sensors 204, 206. In various embodiments, the attitude determination module 202 estimates a nadir vector, which can be used to compute a complete solution to spacecraft attitude. For example, the TRIAD method can be used to convert the nadir vector along with a second reference vector (e.g., a Sun vector) into a unique spacecraft attitude. Illustrative processing for use within the attitude determination module 202 is shown in FIG. 4 and described below on conjunction therewith.

The nadir vector estimation techniques described below rely on precise knowledge of sensor boresight directions, which are used as body-fixed reference vectors. Since the sensor boresight directions do not align with the spacecraft's body axes but tilted in the z-direction to allow horizon sensing, mounting errors are likely to occur during the assembly process of the sensor unit, mostly in the dip angle θ. Accordingly, body-fixed reference vectors for each horizon sensor 204 may be stored, hardcoded, hardwired, or otherwise configured within the attitude determination module 202.

In some embodiments, the attitude determination module 202 is coupled to receive spacecraft position data from a position determination module 226. Many satellites and other type of spacecraft have position knowledge through the Global Positioning System (GPS) and/or Two-line Element (TLE) data. Accordingly, the position determination module 226 could correspond to a GPS module (e.g., a GPS receiver), TLE data, or any other suitable source of position data available upon the spacecraft.

The attitude control system 220 comprises an attitude control module 222 and a plurality of actuators 224. An actuator 224 may correspond to any suitable device for controlling the orientation of a spacecraft (or other body supporting the actuators 224) with respect to an inertial frame of reference. Non-limiting examples of actuators 224 include: thrusters; spin stabilization devices; flywheels, such as reaction wheels, momentum wheels, and control moment gyros; solar sails; gravity-gradient stabilization devices; and magnetic torquers. In various embodiments, the attitude control system 220 comprises three actuators 224a, 224b, and 224c, each actuator controlling orientation along a corresponding one of the spacecraft's three body frame axes.

The attitude control module 222 is configured to receive attitude information generated by the attitude determination system 220, such as an estimated nadir vector, and to adjust the spacecraft's orientation accordingly, using actuators 224. In various embodiments, the attitude control module 222 uses the TRIAD method, orienting the spacecraft such that the body frame +z axis is aligned with the nadir vector, while using a second reference vector (e.g., a Sun vector) to determine rotation around the nadir vector. Other suitable attitude control techniques may be used.

FIGS. 3A-3F illustrate how two or more horizon sensors and an additional reference sensor can be used to estimate a nadir vector for a spacecraft in LEO with relatively high accuracy. The concepts, models, and techniques herein below in conjunction with FIGS. 3A-3F apply to the method of FIG. 4.

Figure 3A:
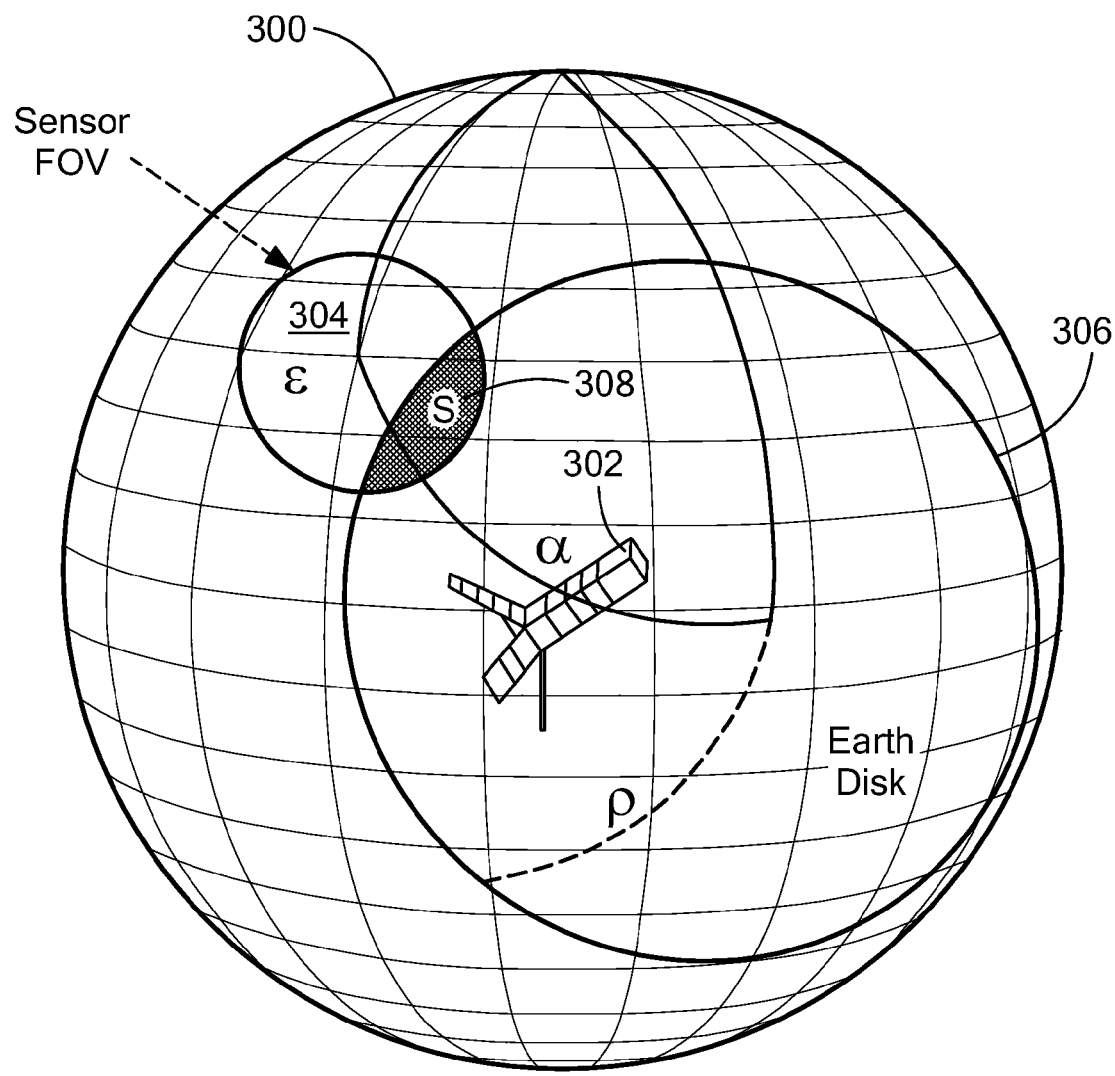
FIG. 3A is a diagram showing a spacecraft-centered celestial sphere with projections of sensor's FOV and Earth disk.

FIG. 3A shows a spacecraft-centered celestial sphere with projections of sensor's FOV and Earth disk. A unit sphere 300 is defined to be centered about a spacecraft 302, as shown. The spacecraft 302, which may be the same as or similar to spacecraft 100 of FIG. 1, comprises horizon sensors, each horizon sensor having a corresponding FOV. A given sensor's FOV, along with Earth, can be projected onto the unit sphere 300 as shown by respective circles 304 and 306. Both projections 304, 306 are modeled as perfect circles with known angular radii. The center of the sensor field projection 304 on the spacecraft-centered sphere 300 represents the direction of the horizon sensor boresight; and the center of the Earth projection (or "Earth disk") 306 denotes the direction of the nadir vector. The area obstructed by Earth in the sensor's FOV is modeled as the overlap area 308 (cross-hatched and denoted S in FIG. 3A) between the projections of the sensor's FOV and Earth onto the spacecraft-centered unit sphere 300.

For simplicity of explanation, it is assumed herein that each horizon sensor has a constant sensitivity across its FOV. In other words, it is assumed that Earth infrared emission at the wavelength of interest is uniform within the sensor's FOV. Thus, the sensor reading is assumed to be proportional to the area obstructed by Earth in the sensor's FOV (i.e., overlap area S 308). In the case where the horizon sensors have Gaussian response (e.g., conventional thermopiles), a Gaussian approximation technique described below in conjunction with FIG. 3E can be used to improve attitude accuracy.

In addition, it is assumed herein the angle subtended by Earth (the Earth disk radius $\rho$) in the spacecraft's body frame remains constant during operation, which is generally only a good approximation when the spacecraft's altitude is unchanging and the horizon curve observed by the sensor is circular. To account for the ellipsoid shape of Earth and/or changing spacecraft altitude, the Earth disk radius $\rho$ can be dynamically determined using the spacecraft's position, as described below in conjunction with FIG. 3F.

The overlap area S 308 between the projections of the sensor's FOV 304 of radius $\epsilon$ and the Earth disk 302 of radius $\rho$ represents the region obstructed by Earth within the sensor's FOV. The angle between the nadir vector and the sensor boresight is denoted by $\alpha$. When $\alpha \geq \rho + \epsilon$, the two circular projections 304, 306 do not overlap, representing the case where Earth is not detected by the sensor. On the other hand, when $\alpha \leq \rho - \epsilon$, the sensor's FOV is fully obstructed by Earth, assuming the sensor's FOV 304 is narrower than the Earth disk 306. Thus, Earth's horizon can be detected by the horizon sensors when $\alpha$ is within the range ($\rho-\epsilon$, $\rho+\epsilon$). The overlap area S 308 in this range can be computed as a function of $\alpha$, $\epsilon$, and $\rho$ as shown in Equation 2.

$$S(\alpha, \varepsilon, \rho) = 2\left[\pi - \cos(\rho)\cos^{-1}\left(\frac{\cos(\varepsilon) - \cos(\rho)\cos(\alpha)}{\sin(\rho)\sin(\alpha)}\right)\right] - \quad \text{(Equation 2)}$$

-continued
$$\cos(\varepsilon)\cos^{-1}\left(\frac{\cos(\rho) - \cos(\varepsilon)\cos(\alpha)}{\sin(\varepsilon)\sin(\alpha)}\right) -$$

$$\cos^{-1}\left(\frac{\cos(\alpha) - \cos(\varepsilon)\cos(\rho)}{\sin(\varepsilon)\sin(\rho)}\right)$$

For known values of $\epsilon$ and $\rho$, this relationship allows a sensor reading (assumed here to be proportional to S) to be converted to a nadir angle $\alpha$ relative to a fixed and known vector in the spacecraft body frame, leading to partial attitude knowledge. Since it may be computationally intensive to invert Equation 2 to solve for $\alpha$ as a function of S, a lookup table implementation can be provided. To narrow down the set of solutions, at least two nadir angles relative to distinct boresight vectors are needed to provide a finite set of nadir vector solutions.

Figure 3B:
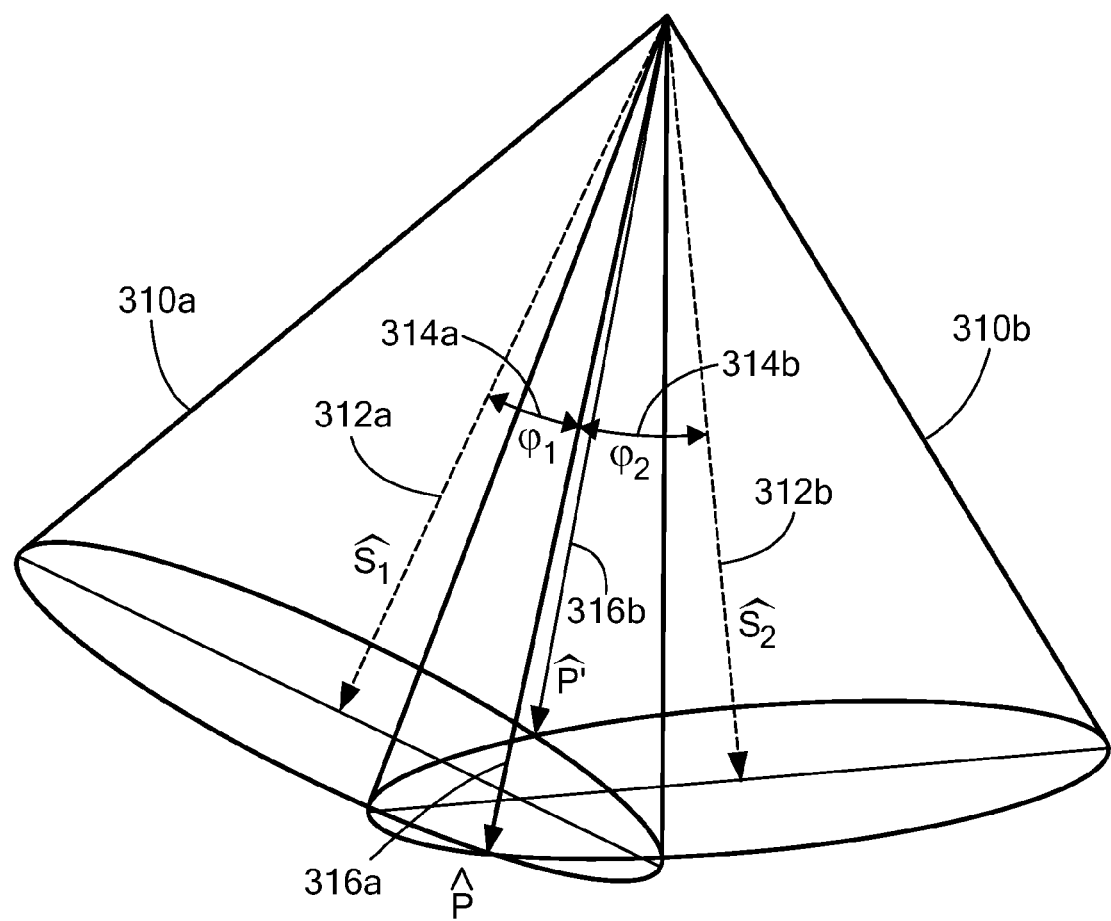
FIG. 3B is a diagram showing a geometric representation of nadir vector solutions.

As shown in FIG. 3B, the problem becomes finding the intersection of two cones 310a, and 310b, each with a different axis direction, defined by respective sensor boresight vectors 312a and 312b, and respective cone angles 314a and 314b. The cone angles 314a, 314b are nadir angles that can determined using Equation 2, described above. As shown, $\hat{S}_1$ and $\hat{S}_2$ represent the sensor boresight vectors, and $\phi_1$ and $\phi_2$ are the corresponding nadir angles. The intersection of cones 310a, 310b are shown as vectors $\hat{P}$ and $\hat{P}'$, representing the two possible nadir vectors.

The analytical form of the possible nadir vectors are the solutions to the following system of equations:

$$\vec{P} \cdot \hat{S}_1 = \cos(\alpha_1)$$

$$\vec{P} \cdot \hat{S}_2 = \cos(\alpha_2)$$

$$|\hat{P}| = 1 \quad \text{(Equations 3).}$$

The first two equations ensure that the angles between the solutions and the boresight vectors equal to the nadir angles $\phi_1$, $\phi_2$ as determined above. The third equation is a normalization condition, which is required for the first two equations to hold. This system of three equations (Equations 3) consists of three variables, which are the three components of the nadir vector. It can be solved analytically through variable eliminations and substitutions for a finite set of solutions. Algebraically, there can be zero, one, or two vector solutions to the system of equations since the third equation is of second order. When both sensors detect the horizon, the system of equations has at least one solution, assuming low sensor noise level. The system of equations (Equations 3) has exactly one solution when the spacecraft is oriented such that the nadir vector is on the plane containing $\hat{S}d$ and $\hat{S}_2$, which is unlikely to occur due to jitters and other disturbances. In most cases, there are two possible nadir vector solutions to the system of equations, leading to ambiguity in the estimation results.

Figure 3C:
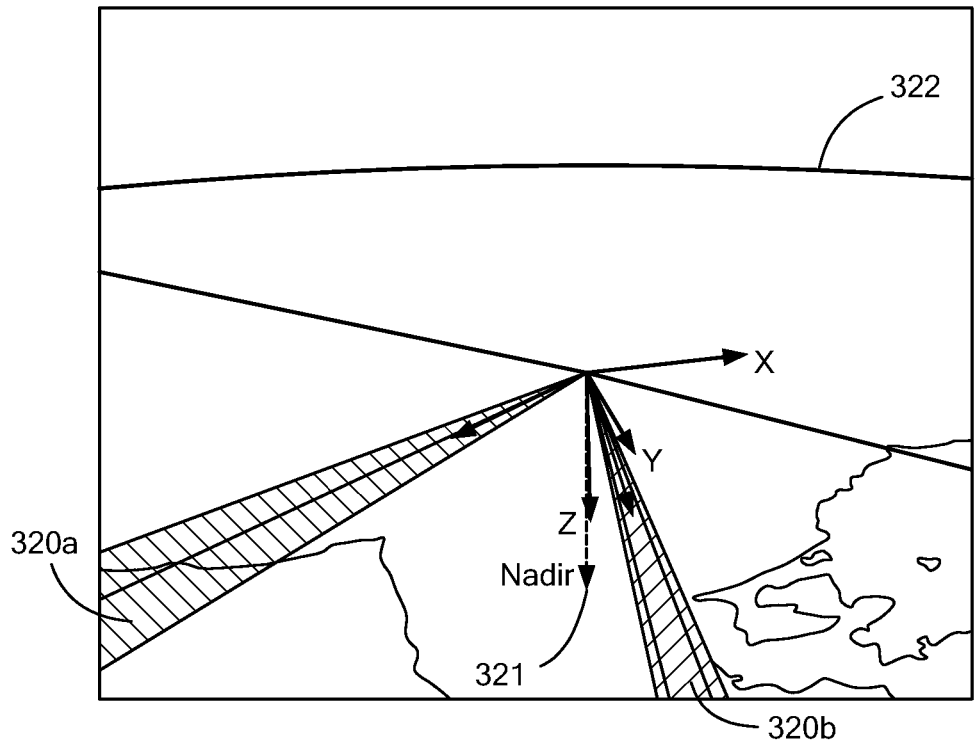
FIGS. 3C and 3D are diagrams showing ambiguous nadir vector solutions.
Figure 3D:
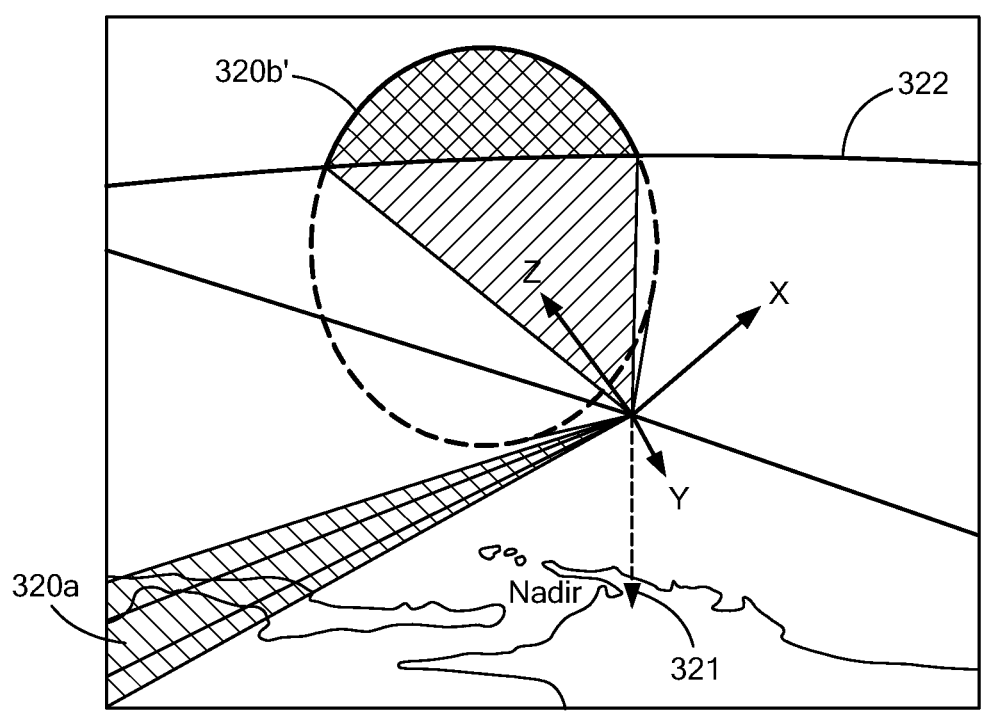

FIGS. 3C and 3D illustrate ambiguity in the possible nadir vector solutions. Within FIGS. 3C and 3D, the arrows labeled "x," "y," and "z" correspond to the +x, +y, and +z directions in a spacecraft's actual body frame. The spacecraft (not shown in FIGS. 3C and 3D) may be the same as or similar to spacecraft 100 of FIG. 1.

FIG. 3C shows a first possible attitude for the spacecraft, where the +z body frame direction is substantially aligned with the spacecraft's true nadir vector 321. The spacecraft may have two horizon sensor's, represented in FIG. 3C by FOV's 320a and 320b.

FIG. 3D shows a second possible attitude for the spacecraft that is the result of rotating the spacecraft about the boresight of one sensor (i.e., the sensor represented by FOV 320a) until the other sensor (i.e., the sensor represented by FOV 320b') detects the other side of Earth's horizon 322. It is appreciated that the two different scenarios of FIGS. 3C and 3D may yield the same horizon sensor readings since both horizon sensors could be obstructed by Earth by the same amount. However, the spacecraft's +z direction is substantially aligned with the nadir vector 321 in FIG. 3C, but not in FIG. 3D.

If, as illustrated in FIGS. 3C and 3D, the possible nadir vector solutions (i.e., $\hat{P}$ and $\hat{P}'$ in FIG. 3B) are well separated, the nadir vector solution ambiguity can be resolved by the use of an additional reference sensor (e.g., reference sensor 206 in FIG. 2). For example, a sun sensor (in daytime) or a magnetometer (in eclipse) could be used to determine that the nadir vector solution corresponding to FIG. 3D is invalid by comparing the reference sensor attitude estimate to the attitude of FIG. 3D.

It can be seen in FIG. 3B as well as proven algebraically that $\hat{P}$ and $\hat{P}'$ are reflections of each other through the plane containing boresight vectors $\hat{S}_1$ and $\hat{S}_2$. Therefore, the angle separation between $\hat{P}$ and $\hat{P}'$ is twice the angle between $\hat{P}$ and the plane defined by vectors $\hat{S}_1$ and $\hat{S}_2$. The angle separation between $\hat{P}$ and $\hat{P}'$, denoted as $\theta_{pp'}$, can be computed as show in Equation 4.

$$\theta_{pp'} = 2\left|\sin^{-1}\left(\hat{P} \cdot \frac{(\hat{S}_1 \times \hat{S}_2)}{|\hat{S}_1 \times \hat{S}_2|}\right)\right| \quad \text{(Equation 4)}$$

The separation angle between the possible nadir solutions depends on the relative position of the nadir vector ($\hat{P}$) and the sensor boresight vectors ($\hat{S}_1$ and $\hat{S}_2$). When the sensors have narrow FOV, the sensor readings are only valid when one of the possible nadir solutions is in near alignment with the z-axis. In this case, the separation angle can be expressed in terms of the dip angle $\theta_z$ between the sensors' boresights and the x-y body plane, as shown in Equation 5. The dip angle $\theta_z$ is defined above in conjunction with FIG. 1.

$$\theta_{pp'} \cong 2\left|\sin^{-1}\left(\frac{\cos\theta_Z}{\sqrt{1+\sin^2\theta_Z}}\right)\right| \quad \text{(Equation 5)}$$

In some embodiments, the horizon sensors are configured such that the angle separation between the two possible nadir solutions $\theta_{pp'}$ is at least 106°. For example, at an altitude of 500 km and with sensors' FOV half-angle of 5°, the angle separation between the two possible nadir solutions $\theta_{pp'}$ is approximately 120° when one of the solutions aligns with the z-axis and 106° in the worst case scenario. With such a wide angle separation, the nadir vector ambiguity can be easily resolved during nadir acquisition by comparing the two possible solutions to the reading of an additional reference attitude sensor (e.g., reference sensor 206 in FIG. 2). While wide FOV sensors increase the range of attitude in which horizon sensor readings are valid, the separation angle between the nadir solutions could be significantly reduced. For example, when the FOV half-angle is 30°, the separation angle can be as narrow as 2.3°. This ambiguity requires an additional reference sensor with better resolution to be resolved. Accordingly, in some embodiments, a spacecraft includes a first EHS system with wide FOV and/or other reference sensors to acquire close to nadir-pointing and a second EHS system with relatively narrow FOV to determine more accurate attitude knowledge.

Figure 3E:
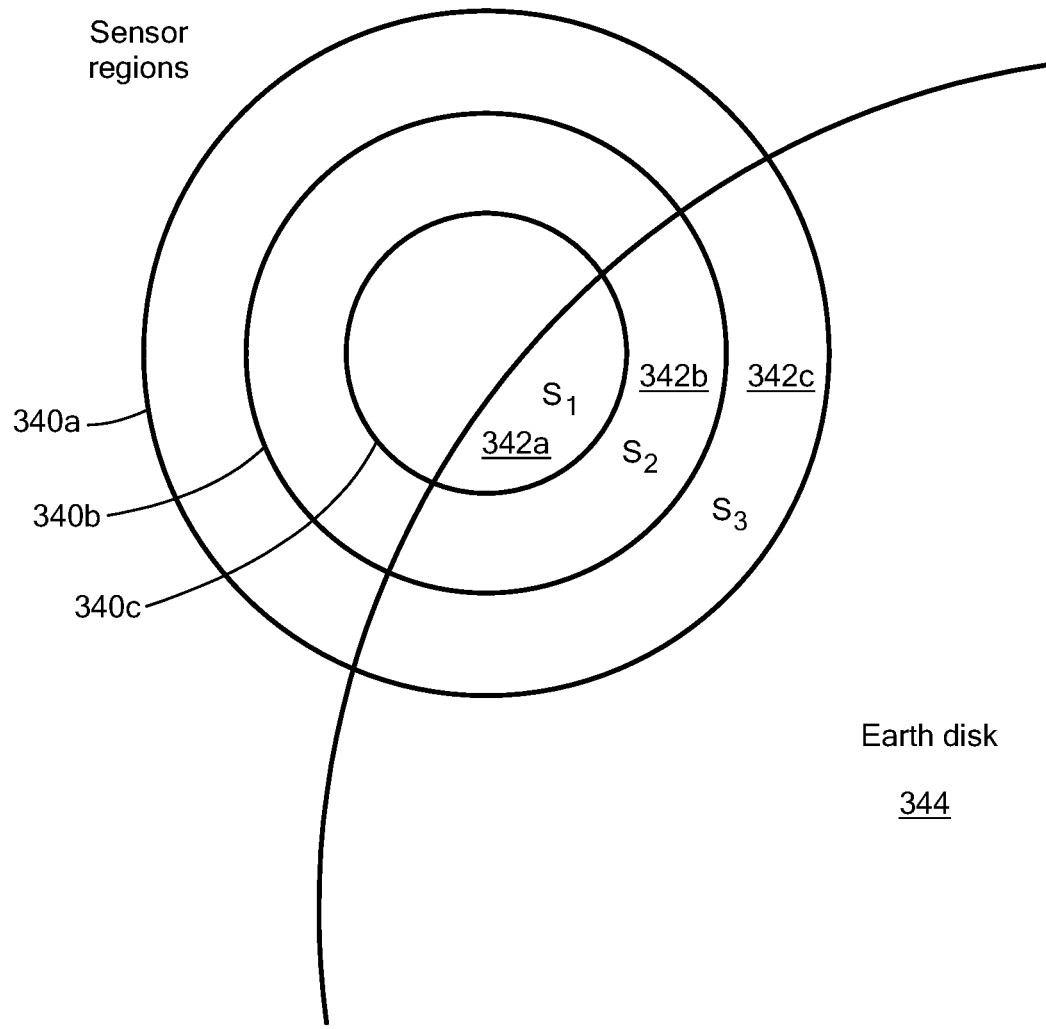
FIG. 3E is a diagram showing a Gaussian sensitivity approximation.

Referring to FIG. 3E, the nadir vector estimation technique described above assumes that the sensor sensitivity is constant within the sensor's FOV. This technique is therefore said to employ a "uniform model." Most commercial thermopiles, however, have Gaussian responsivity characteristics. In various embodiments, the Gaussian pattern of the sensor sensitivity can be incorporated into the nadir vector estimation technique described above to improve accuracy. This later technique is said to employ a "Gaussian model."

Since modeling a sensor's sensitivity as a continuous 2D Gaussian function significantly increases the complexity of the obscuration calculation, the sensor field can instead be divided into regions 340 of constant sensitivity to approximate the Gaussian pattern. FIG. 3E shows an example of such Gaussian approximation with three constant sensitivity regions 340a, 340b, and 340c, in descending order of sensitivity. For a valid horizon sensor reading, one or more of the regions 340 will overlap with the Earth disk 344 to define respective overlap area 342. In this example, each of the three regions 340a, 340b, and 340c overlap with the Earth disk 344, with the corresponding overlap areas denoted $S_1$ 342a, $S_2$ 342b, and $S_3$ 342c. By using the overlap function $S(\alpha, \epsilon, \rho)$ from Equation 2 above, the overlap areas $S_1$, $S_2$, and $S_3$ can be computed by changing the sensor's angular radius parameter $\epsilon$ to the corresponding FOV half-angle of each sensor region. These calculations are shown in Equations 6, where $r_1$, $r_2$, $r_3$ ($r_1 < r_2 < r_3$) denote the radii of the regions' circular boundaries as projected onto a unit sphere around the spacecraft.

$$S_1 = S(\alpha, r_1, \rho)$$

$$S_2 = S(\alpha, r_2, \rho) - S(\alpha, r_1, \rho)$$

$$S_3 = S(\alpha, r_3, \rho) - S(\alpha, r_2, \rho) \quad \text{(Equations 6)}$$

The sensor response becomes the weighted sum of $S_1$, $S_2$, and $S_3$, with appropriate Gaussian approximation coefficients. It should be understood that, although this example shows three sensor regions 340, the techniques described herein could readily be adapted to any number of sensor regions greater than one.

The sensor response values can be pre-computed for different values of nadir angles to construct a lookup table. This lookup table, consisting of the modified sensor response and the corresponding nadir angle, can be pre-computed and stored upon the spacecraft (e.g., within the attitude determination module 202 of FIG. 2) for efficient nadir angle conversion for on-orbit operation.

Figure 3F:
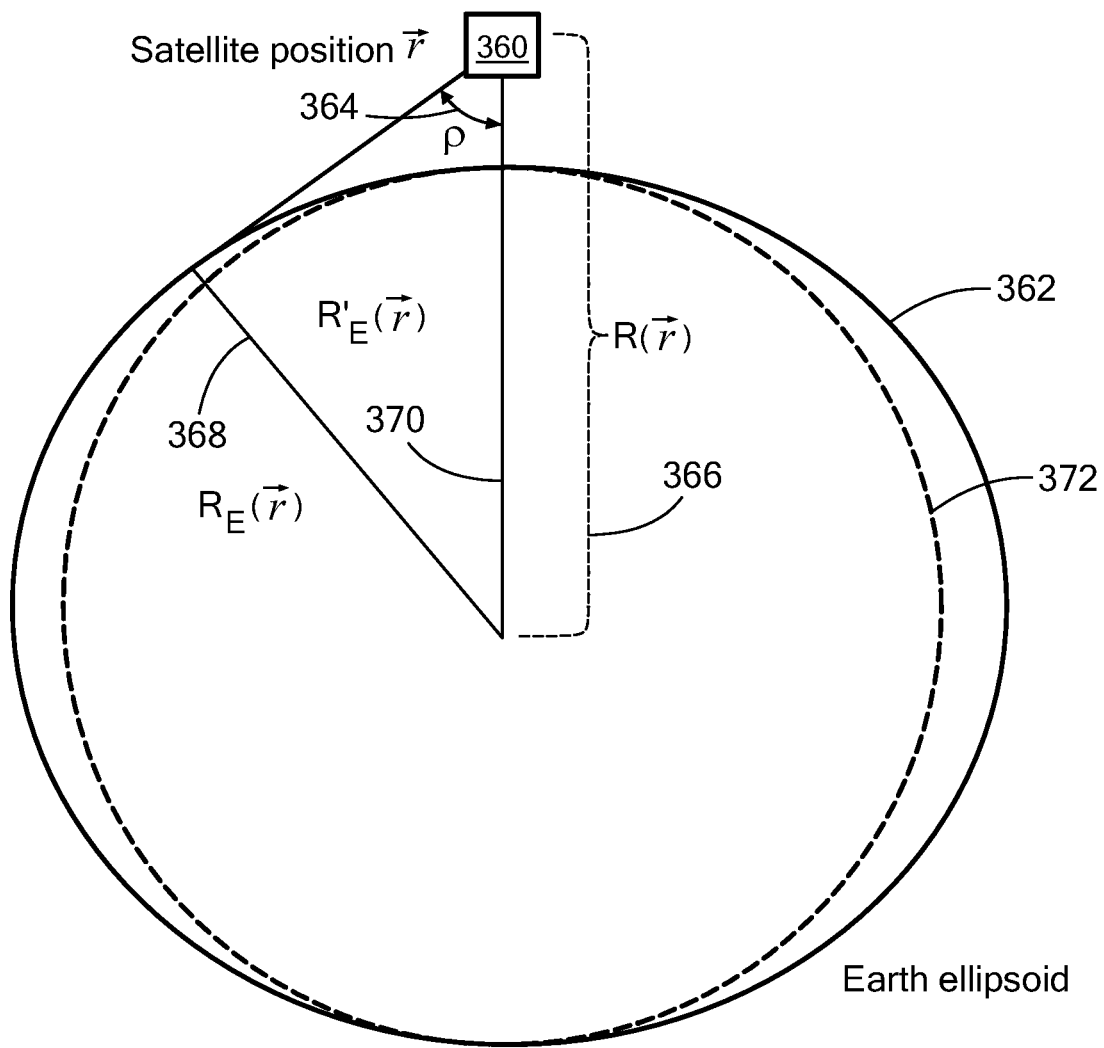
FIG. 3F is a diagram of a technique for determining Earth disk radius using spacecraft position information.

Referring to FIG. 3F, in the description above, it is assumed that the half-angle subtended by Earth from the spacecraft's body frame is constant (the half-angle is denoted $\rho$ in FIG. 3A). However, this assumption may result in significant inaccuracy in attitude estimation in the case of spacecraft in high-eccentricity orbit or in de-orbiting phase. As described above, the spacecraft may have position knowledge via a position determination module (e.g., position determination module 226 in FIG. 2). Such position knowledge can be used to better estimate the angle subtended by Earth in the spacecraft's body frame, improving the accuracy of the estimation method.

FIG. 3F shows a spacecraft 360 in orbit around Earth 362. It can be observed that the Earth half-angle (denoted $\rho$ 364) is a function of the orbit radius (denoted $R(\vec{r})$ 366) and the Earth radius at the horizon (denoted $R_E(\vec{r})$ 368). For spacecraft with low altitude (i.e., in LEO), the Earth radius 368 can be approximated as the Earth radius directly under the spacecraft (denoted $R'_E(\vec{r})$ 370). The Earth's half-angle 364 can be approximated as shown in Equation 7, where $\vec{r}$ represents the spacecraft's position vector in an Earth-centered reference frame, $\theta_{gc}(\vec{r})$ represents a geocentric latitude of the spacecraft, a represents Earth's equatorial radius, and b represents Earth's polar radius.

$$\rho \cong \sin^{-1}\left(\frac{R'_E(\vec{r})}{R(\vec{r})}\right)$$  (Equation 7)

$$\cong \sin^{-1}\frac{\left(\frac{\cos^2(\theta_{gc}(\vec{r}))}{a^2} + \frac{\sin^2(\theta_{gc}(\vec{r}))}{b^2}\right)^{-\frac{1}{2}}}{|\vec{r}|}$$

The orbit radius $R(\vec{r})$ 366 can be computed as the magnitude of the position vector. The Earth radius directly under the spacecraft $R_E(\vec{r})$ 368 can be computed using the World Geodetic System 84 Ellipsoid Earth model. To avoid additional complexity, Earth's shape can be assumed to be spherical with radius $R'_E(\vec{r})$ in other parts of the analysis, as shown by dashed line 372 in FIG. 3F. As a result, the angle $\rho$ 364 subtended by Earth from the spacecraft body frame can be estimated efficiently (and, in some cases, in real time) based on the spacecraft's position knowledge.

FIG. 4 is a flowchart showing illustrative processing that can be implemented within a spacecraft and, more particularly, within an attitude determination and/or control system, such as systems 200 and 220 of FIG. 1. Rectangular elements (typified by element 402), herein denoted "processing blocks," represent computer software instructions or groups of instructions. Alternatively, the processing blocks may represent steps performed by functionally equivalent circuits such as a digital signal processor circuit or an application specific integrated circuit (aSIC). The flow diagram does not depict the syntax of any particular programming language, but rather illustrates the functional information one of ordinary skill in the art requires to fabricate circuits or to generate computer software to perform the processing described. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered, meaning that, when possible, the functions represented by the blocks can be performed in any convenient or desirable order.

Referring to FIG. 4, an illustrative method 400 begins at block 402, where horizon sensor readings are obtained. In various embodiments, a first reading is obtained from a horizon sensor mounted along a spacecraft's x axis (e.g., sensor 204a in FIG. 2) and a second reading is obtained from a horizon sensor mounted along the spacecraft's y axis (e.g., sensor 204b in FIG. 2). The sensor readings can be used to estimate the area of the respective horizon sensors' field of view that is obstructed by Earth, as described below in conjunction with block 406.

At block 404, the Earth disk radius (e.g., radius $\rho$ in FIG. 3A) is determined. As described above in conjunction with FIGS. 3A and 3F, the angle subtended by Earth (the Earth disk radius $\rho$) in the spacecraft's body frame can be modeled as a constant, which is a good approximation when the spacecraft's altitude is substantially unchanging. However, this assumption results in significant inaccuracy in attitude estimation in the case of spacecraft in high-eccentricity orbit or in de-orbiting phase. Thus, in some embodiments, the processing of block 404 corresponds to simply obtaining a constant Earth disk radius $\rho$. For example, the radius could be predetermined based upon a target spacecraft altitude and "hardcoded" within the attitude determination module. However, in other embodiments, block 444 corresponds to using spacecraft position data (e.g., GPS or TLE data) to estimate the angle subtended by Earth in the spacecraft's body frame $\rho$, such as using the technique described above in conjunction with FIG. 3F.

At block 406, the horizon sensor readings obtained at block 402 are converted to nadir angles using either using either a uniform model or a Gaussian model. As described above in conjunction with FIGS. 3A and 3E, commercially available EHSs typically have Gaussian sensitivity across their FOVs. In such cases, attitude accuracy can be improved using Gaussian approximation of the sensor sensitivity, by dividing the sensor field into multiple regions, as shown in FIG. 3E. However, if such improved accuracy is not required (or if the horizon sensor sensitivity is constant within the sensor's FOV), a uniform model may be used whereby the sensor reading is assumed to be proportional to the area obstructed by Earth in the sensor's FOV. Accordingly, the model used at block 406 may depend upon the type of horizon sensors used and/or the required attitude accuracy.

If the uniform model is used, block 406 may correspond to solving Equation 2 for the nadir angle $\alpha$ as a function of S, which is proportional to the sensor reading obtained, as described above in conjunction with FIG. 3A. Otherwise, if the Gaussian model is used, the sensor response may be approximated as the weighted sum of Equations 6 (i.e., the weighted sum of $S_1$, $S_2$, and $S_3$) with appropriate Gaussian approximation coefficients, which can be solved along with Equation 2 for the nadir angle $\alpha$, as described above in conjunction with FIGS. 3A and 3E. When solving Equation 2 for a, the Earth disk radius $\rho$ determined at block 404 can be used. This processing described herein is performed for each sensor reading obtained at block 402, resulting in two nadir angles $\phi_1$ and $\phi_2$ in the case of two horizon sensors.

At block 408, possible nadir vector solutions are computed. In some embodiments, this corresponds to solving a system of equations (e.g., Equations 3) for two possible nadir vectors (e.g., vectors $\hat{P}$ and $\hat{P}'$), as described above in conjunction with FIG. 3B.

At block 410, a reference sensor reading is obtained, such as a reading from reference sensor 206 in FIG. 2. At block 412, one of the nadir vectors solutions obtained at block 408 is chosen based upon the reference sensor reading. As described above in conjunction with FIGS. 3C and 3D, if the angle separation $\theta_{pp'}$ between the two possible nadir solutions is sufficiently large, the nadir vector ambiguity can be resolved by comparing the two possible solutions to the reading of the reference sensor.

At block 414, the spacecraft's attitude can be adjusted based upon the chosen nadir vector. For example, actuators (such as actuators 224 in FIG. 2) may be employed to perform 3-axis stabilization using the chosen nadir vector and a second reference vector (e.g., a Sun vector). Any suitable attitude control techniques can be used.

In some embodiments, the processing of blocks 402-412 is implemented within an attitude determination module 202 of FIG. 2, and the processing of block 414 is implemented within an attitude control module 222 of FIG. 2.

Figure 5:
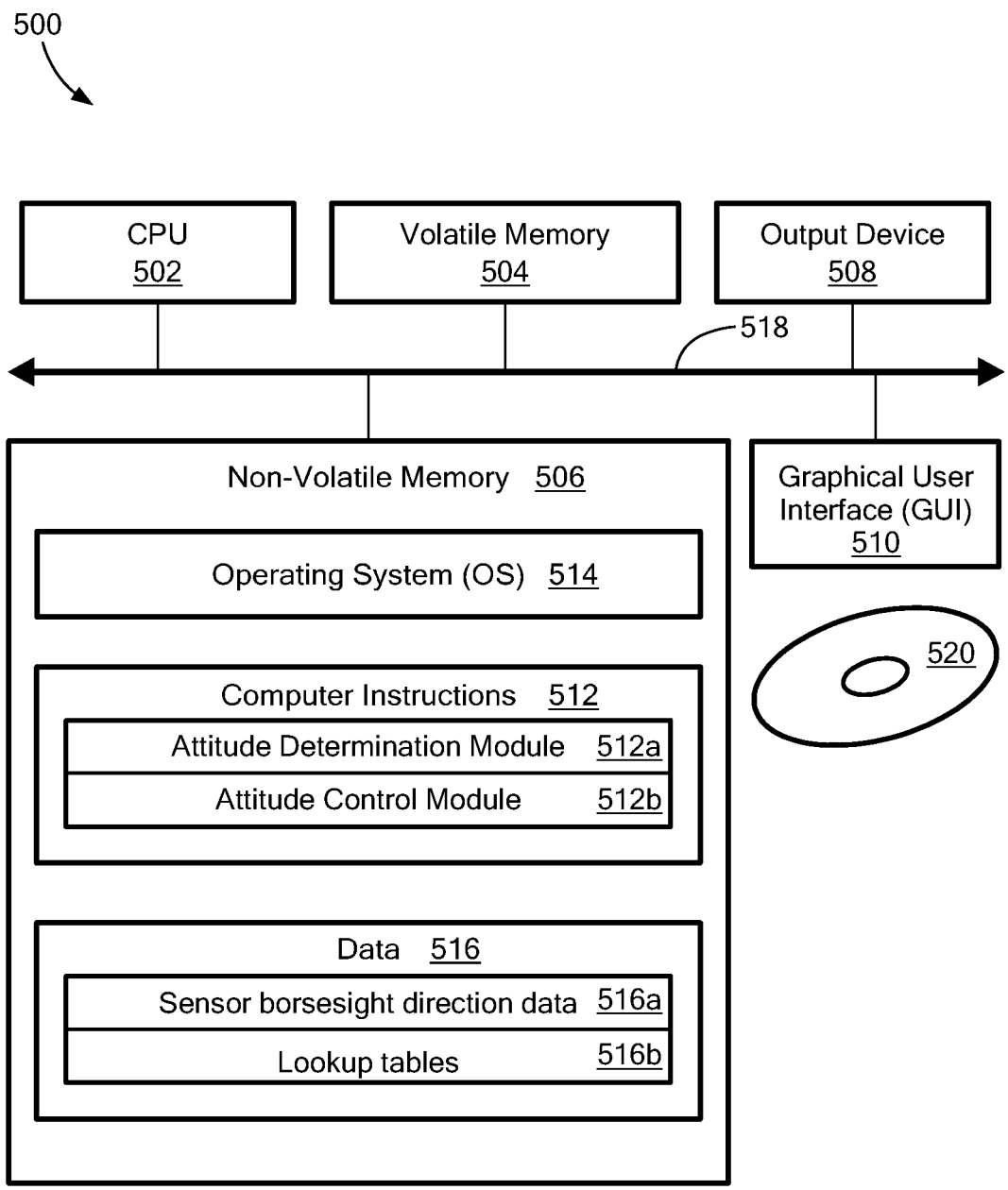
FIG. 5 is a schematic representation of an illustrative computer for use with the systems and methods of FIGS. 1, 2, and 4.

FIG. 5 shows an illustrative computer or other processing device 500 that can perform at least part of the processing described herein. In some embodiments, the spacecraft 100 of FIG. 1 includes computer 500, or otherwise forms a portion thereof. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. As shown, the computer instructions 512 may include attitude determination module instructions 512 and/or attitude control module instructions 514 corresponding to computer instructions for the modules 202 and 222 of FIG. 2, respectively. The data 516 may include sensor boresight direction data 516a indicating the precision direction of the horizon and/or reference sensors relative to a spacecraft body frame. In some embodiments, data 516 includes one or more lookup tables 516b used to solve for nadir vectors, as described above in conjunction with FIGS. 3A-3F. In one example, the computer instructions 512 are executed by the processor 502 out of volatile memory 504. In some embodiments, an article 520 comprises non-transitory computer-readable instructions.

Processing may be implemented in hardware, software, or a combination of the two. In embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A system for spacecraft attitude determination, the system comprising:
   a plurality of horizon sensors, each of the plurality of horizon sensors having a respective field-of-view (FOV), each of the plurality of horizon sensors having a sensitivity to the portion of the respective FOV obscured by Earth;
   an attitude determination module coupled to the plurality of horizon sensors, the attitude determination module configured to:
      obtain horizon sensor readings from the horizon sensors;
      determine an Earth disk radius in a spacecraft's body frame;
      convert the horizon sensor readings to nadir angles using a Gaussian approximation including dividing the horizon sensor FOV into a plurality of constant sensitivity regions each having a Gaussian approximation coefficient; and
      estimate a nadir vector using the nadir angles and the Earth disk radius.

2. The system of claim 1 further comprising a reference sensor coupled to provide reference sensor readings to the attitude determination module, wherein the attitude determination module is configured to:
   determine a plurality of possible nadir vector solutions using the nadir angles and the Earth disk radius;
   obtain a reference sensor reading; and
   choose one of the plurality of possible nadir vector solutions based upon the reference sensor reading.

3. The system of claim 2, wherein the plurality of horizon sensors comprise a first horizon sensor and a second horizon sensor mounted along orthogonal axes.

4. The system of claim 1 wherein at least one of the plurality of horizon sensors comprises a thermopile.

5. The system of claim 1 wherein at least one of the plurality of horizon sensors comprises an infrared radiation (IR) sensor.

6. The system of claim 3 wherein the reference sensor comprises a magnetometer or a Sun sensor.

7. The system of claim 1 further comprising an attitude control module coupled to receive estimated nadir vector information from the attitude determination module, the attitude control module configured to adjust a spacecraft's attitude based upon received estimated nadir vector information.

8. The system of claim 1 wherein the attitude determination module is configured to:
   receive spacecraft position information; and
   determine an Earth disk radius in a spacecraft's body frame based upon the spacecraft position information.

9. A method for spacecraft attitude determination, the method comprising:
   obtaining horizon sensor readings from a plurality of horizon sensors, each of the plurality of horizon sensors having a respective field-of-view (FOV), each of the plurality of horizon sensors having a sensitivity to the portion of the respective FOV obscured by Earth;
   determining an Earth disk radius in a spacecraft's body frame;
   converting the horizon sensor readings to nadir angles using a Gaussian approximation including dividing the horizon sensor FOV into a plurality of constant sensitivity regions each having a Gaussian approximation coefficient; and
   estimating a nadir vector using the nadir angles and the Earth disk radius.

10. The method of claim 9 further comprising:
   determining a plurality of possible nadir vector solutions using the nadir angles and the Earth disk radius;
   obtaining a reference sensor reading from a reference sensor; and
   choosing one of the plurality of possible nadir vector solutions based upon the reference sensor reading.

11. The method of claim 10, wherein obtaining horizon sensor readings from horizon sensors comprises obtaining a horizon sensor readings from a first horizon sensor and from a second horizon sensor mounted along orthogonal axes.

12. The method of claim 9 wherein obtaining horizon sensor readings from horizon sensors comprises obtaining readings from thermopiles.

13. The method of claim 9 wherein obtaining horizon sensor readings from horizon sensors comprises obtaining readings from infrared radiation (IR) sensors.

14. The method of claim 11 wherein obtaining a reference sensor reading comprises obtaining a reading from a magnetometer or a Sun sensor.

15. The method of claim 9 further comprising adjusting a spacecraft's attitude based upon an estimated nadir vector.

16. The method of claim 9 further comprising receiving spacecraft position information, wherein determining an Earth disk radius in a spacecraft's body frame comprises determining an Earth disk radius based upon the spacecraft position information.

17. The system of claim 1 wherein the attitude determination module is configured to determine the Earth disk radius in the spacecraft's body frame using a geocentric latitude of the spacecraft, an equatorial radius of the Earth, and a polar radius of the Earth.

18. The system of claim 1 wherein the plurality of horizon sensors comprise a first horizon sensor having a first boresight vector in the spacecraft's body frame and a second horizon sensor having a second boresight vector in the spacecraft's body frame, wherein the nadir angles include a first nadir angle and a second nadir angle, and wherein the attitude determination module is configured to estimate the nadir vector by finding the intersection of a first cone defined by the first boresight vector and the first nadir angle and a second cone defined by the second boresight vector and the second nadir angle.

19. A method for spacecraft attitude determination, the method comprising:
   obtaining horizon sensor readings from a plurality of horizon sensors, each of the plurality of horizon sensors having a respective field-of-view (FOV), a sensitivity to the portion of the respective FOV obscured by Earth, and a boresight vector in a spacecraft body frame;
   determining an Earth disk radius in a spacecraft's body frame using a geocentric latitude of the spacecraft, an equatorial radius of the Earth, and a polar radius of the Earth;
   converting the horizon sensor readings to nadir angles; and
   estimating a nadir vector using the Earth disk radius and by finding the intersection of a first cone defined by the boresight vector of a first one of the plurality of horizon sensors and a first one of the nadir angles and a second cone defined by the boresight vector of a second one of the plurality of horizon sensors and a second one of the nadir angles.

* * * * *

UNITED STATES PATENT AND TRADEMARK OFFICE
CERTIFICATE OF CORRECTION

PATENT NO. : 9,809,328 B2
APPLICATION NO. : 14/644425
DATED : November 7, 2017
INVENTOR(S) : Tam Nguyen Thuc Nguyen et al.

Page 1 of 1

It is certified that error appears in the above-identified patent and that said Letters Patent is hereby corrected as shown below:

In the Specification

Column 7, Line 50, delete "∈" and replace with --ε--

Column 7, Line 53, delete "α ≥ ρ + ∈" and replace with --α ≥ ρ + ε--

Column 7, Line 56, delete "α ≤ ρ − ∈" and replace with --α ≤ ρ − ε--

Column 7, Lines 60, delete "(ρ - ∈, ρ + ∈)." and replace with --(ρ - ε, ρ + ε).--

Column 7, Line 61, delete "∈, and" and replace with --ε, and--

Column 8, Line 8, delete "of ∈" and replace with --of ε--

Column 8, Line 13, delete "a as" and replace with --α as--

Column 8, Equation 3, delete "$\vec{p} \cdot \vec{S}_1 = \cos(\alpha_1)$" and replace with --$\vec{p} \cdot \vec{S}_1 = \cos(\alpha_1)$--

Column 8, Line 51, delete "$\vec{S}_1$ and $\vec{S}_2$" and replace with --$\vec{S}_1$ and $\vec{S}_2$--

Column 10, Line 27, delete "(α, ∈, ρ)" and replace with --(α, ε, ρ)--

Column 10, Line 29, delete "∈ to the" and replace with --ε to the--

Column 11, Line 1, delete "(denoted $R_g(\vec{r})$ 368)" and replace with --(denoted $R_g(\vec{r})$ 368).--

Signed and Sealed this
Thirteenth Day of February, 2018

Andrei Iancu
*Director of the United States Patent and Trademark Office*